US012423670B2

(12) United States Patent
Chen et al.

(10) Patent No.: US 12,423,670 B2
(45) Date of Patent: Sep. 23, 2025

(54) METHOD, SYSTEM, AND COMPUTER PROGRAM PRODUCT FOR PROVIDING INSTALLMENT PAYMENT OPTIONS FOR A PAYMENT TRANSACTION

(71) Applicant: Visa International Service Association, San Francisco, CA (US)

(72) Inventors: Yuexi Chen, Foster City, CA (US); Eduardo Andre Vaena, Danville, CA (US); Xiaodong Jiang, San Carlos, CA (US); Sarthak Basak, Singapore (SG); Mathieu André Guy Altwegg, Singapore (SG); Hamish Geoffrey Moline, Singapore (SG); Madhur Singhal, Singapore (SG); Liza Maree Agresta, Baulkham Hills (AU); Geir Forde, Manly (AU)

(73) Assignee: Visa International Service Association, San Francisco, CA (US)

( * ) Notice: Subject to any disclaimer, the term of this patent is extended or adjusted under 35 U.S.C. 154(b) by 83 days.

(21) Appl. No.: 17/576,332

(22) Filed: Jan. 14, 2022

(65) Prior Publication Data
US 2022/0138719 A1    May 5, 2022

Related U.S. Application Data

(63) Continuation of application No. 16/558,781, filed on Sep. 3, 2019, now Pat. No. 11,250,407.
(Continued)

(51) Int. Cl.
*G06Q 20/24* (2012.01)
*G06Q 20/32* (2012.01)
(Continued)

(52) U.S. Cl.
CPC ......... *G06Q 20/24* (2013.01); *G06Q 20/3223* (2013.01); *G06Q 20/385* (2013.01); *G06Q 20/40* (2013.01); *G06Q 40/03* (2023.01)

(58) Field of Classification Search
CPC ...................................................... G06Q 40/03
(Continued)

(56) References Cited

U.S. PATENT DOCUMENTS

2006/0155639 A1    7/2006  Lynch et al.
2007/0255653 A1   11/2007  Tumminaro et al.
(Continued)

*Primary Examiner* — Lindsay M Maguire
(74) *Attorney, Agent, or Firm* — The Webb Law Firm

(57) ABSTRACT

Provided is a method for providing installment payment options for a payment transaction. The method may include communicating, to a customer device, installment payment data associated with a plurality of installment payment options. A first authorization request for a payment transaction with a customer may be received from a merchant system. The first authorization request may include at least one field including first installment payment data associated with a first installment payment option. A first lender system associated with the first installment payment option may be determined. A second authorization request, which may include the first installment payment data, may be communicated to the first lender system. An authorization response may be received from the first lender system indicating approval of the first installment payment option for the payment transaction. The authorization response may be communicated to the merchant system. A system and computer program product are also disclosed.

13 Claims, 6 Drawing Sheets

Related U.S. Application Data

(60) Provisional application No. 62/725,553, filed on Aug. 31, 2018.

(51) Int. Cl.
*G06Q 20/38* (2012.01)
*G06Q 20/40* (2012.01)
*G06Q 40/03* (2023.01)

(58) Field of Classification Search
USPC .......................................................... 705/38
See application file for complete search history.

(56) References Cited

U.S. PATENT DOCUMENTS

| | | |
|---|---|---|
| 2009/0271262 A1 | 10/2009 | Hammad |
| 2011/0218905 A1 | 9/2011 | Zeringue |
| 2014/0188710 A1 | 7/2014 | Basu et al. |
| 2015/0134528 A1 | 5/2015 | Fineman et al. |
| 2015/0278949 A1 | 10/2015 | Don et al. |
| 2016/0071102 A1 | 3/2016 | Alvarez et al. |
| 2016/0321634 A1 | 11/2016 | George et al. |
| 2017/0186006 A1 | 6/2017 | Das |
| 2017/0270604 A1 | 9/2017 | Abela et al. |
| 2017/0323280 A1 | 11/2017 | Desilva et al. |
| 2019/0188789 A1 | 6/2019 | Steenbeek et al. |

METHOD, SYSTEM, AND COMPUTER PROGRAM PRODUCT FOR PROVIDING INSTALLMENT PAYMENT OPTIONS FOR A PAYMENT TRANSACTION

CROSS-REFERENCE TO RELATED APPLICATIONS

The present application is a continuation of U.S. patent application Ser. No. 16/558,781, filed Sep. 3, 2019, which claims the benefit of U.S. Provisional Patent Application No. 62/725,553 filed Aug. 31, 2018, the disclosures of which are hereby incorporated by reference in their entireties.

BACKGROUND

1. Field

This disclosed subject matter relates generally to methods, systems, and products for providing installment payment options and, in some particular embodiments, to a method, system, and computer program product for providing installment payment options for a payment transaction using a consumer device.

2. Technical Considerations

Certain consumer accounts (e.g., credit accounts, credit card accounts, and/or the like) allow a consumer to complete a transaction (e.g., purchase goods and/or services) and pay for the transaction later. For example, issuers of such consumer accounts may determine a balance owed for all such transactions during a time period (e.g., a month) and thereafter allow the consumer to pay at least a portion of the balance by a due date at the end of a time period for payment. Issuers of such accounts may then charge interest (e.g., a percentage) for any remaining balance after the due date. Alternatively, rather than charge interest based on the balance of such a consumer account, the issuer thereof may provide an option for the consumer to make installment payments, whereby the consumer makes payments of a specific amount per time period for a given number of time periods, at the end of which the balance (or a specific portion thereof) will be considered paid off. Alternatively, the merchant may provide an option to the consumer to pay off the payment transaction by installment payments to the merchant.

However, in accepting the option for installment payments from the issuer, the consumer may be disadvantaged because the consumer may only select from installment payment options (e.g., rates, time periods for repayment, and/or the like) from one lender (i.e., the issuer), which may have installment payment options that are less favorable (e.g., higher rates, shorter or different periods of time, and/or the like) than the market (e.g., other lenders willing to make consumer loans for installment payments). Additionally, the consumer will need to have sufficient funds available in the consumer account (e.g., available credit) to complete the transaction, and at least a portion of the funds available in the consumer account may be made unavailable (e.g., a hold on a portion of the available credit) while the installment payments are being made. Similarly, in accepting the option for installment payments from the merchant, the consumer may be disadvantaged because the consumer may only select from installment payment options from one lender (i.e., the merchant), which may have installment payment options that are less favorable than the market. Additionally, providing such installment payment options may be burdensome on the merchant. For example, the merchant may have to modify its systems (e.g., point-of-sale (POS) devices, back office systems, and/or the like) to display the option to consumers, determine the amounts and time periods for the installment payments, handle reception and processing of the installment payments (e.g., directly from consumers, through a plurality of issuers of different consumers, and/or the like), handle the loan risk, and/or the like.

SUMMARY

Accordingly, it is an object of the presently disclosed subject matter to provide methods, systems, and computer program products for providing installment payment options for a payment transaction.

According to non-limiting embodiments, provided is a method for providing installment payment options for a payment transaction. In some non-limiting embodiments, a method for providing installment payment options for a payment transaction may include communicating, to a customer device, installment payment data associated with a plurality of installment payment options. A first authorization request for a payment transaction with a customer of the customer device may be received from a merchant system. The first authorization request may include at least one field comprising first installment payment data associated with a first installment payment option of the plurality of installment payment options. A first lender system associated with the first installment payment option may be determined based on the first installment payment data. A second authorization request may be communicated to the first lender system. The second authorization request may include the first installment payment data. A first authorization response may be receiving from the first lender system. The first authorization response may indicate approval of the first installment payment option for the payment transaction. A second authorization response indicating approval of the payment transaction may be communicated to the merchant system.

In some non-limiting embodiments, before communicating the installment payment data, account identifier data associated with an account identifier of the customer may be received from a mobile payment application on the customer device. Additionally or alternatively, a payment token associated with the account identifier may be generated. Additionally or alternatively, the payment token may be communicated to the mobile payment application of the customer device.

In some non-limiting embodiments, the first authorization request may be received in response to the customer device communicating the payment token to the merchant system.

In some non-limiting embodiments, after communicating the installment payment data, a first message may be received from the customer device. The first message may include an indication of the first installment payment option of the plurality of installment payment options, customer data associated with personal information of the customer, and potential purchase data associated with a potential purchase of the customer. Additionally or alternatively, the first lender system associated with the first installment payment option may be determined based on the indication of the first installment payment option. Additionally or alternatively, a second message may be communicated to the first lender system. The second message may include the indication of the first installment payment option, the customer data, and the potential purchase data. Additionally or alternatively, a third message may be received from the first lender system. The third message may indicate approval of the first installment payment option for the payment transaction. Additionally or alternatively, a fourth message communicated to the customer device. The fourth message may indicate approval of the first installment payment option for the payment transaction. Additionally or alternatively, the fourth message may include the first installment payment data associated with the first installment payment option. Additionally or alternatively, the customer device may store the first installment payment data.

In some non-limiting embodiments, the first authorization request may be received in response to the customer device communicating to the merchant system the first installment payment data and at least one of account identifier data associated with an account identifier of the customer or a payment token associated with the account identifier of the customer. Additionally or alternatively, the first authorization request may further include the at least one of the account identifier data or the payment token. In some non-limiting embodiments, the at least one of the account identifier data or the payment token from the first authorization request may be validated. Additionally or alternatively, the first installment payment data may be extracted from the at least one field of the first authorization request. The first installment payment data may be validated based on a comparison of the first installment payment data of the authorization request and the first installment payment data of the fourth message.

In some non-limiting embodiments, the first authorization request may include the payment token. Additionally or alternatively, the payment token may be converted into the account identifier data.

In some non-limiting embodiments, the payment transaction may be settled between the first lender system and an acquirer system associated with the merchant system. Additionally or alternatively, periodic payments may be settled between an issuer system associated with a customer account of the customer and the first lender system.

In some non-limiting embodiments, a transaction amount of the payment transaction may be transferred from the first lender system to an issuer system associated with a customer account of the customer. Additionally or alternatively, a third authorization request for the payment transaction may be communicated to the issuer system. Additionally or alternatively, a third authorization response indicating approval of the payment transaction may be received from the issuer system before communicating the second authorization response. In some non-limiting embodiments, periodic payments may be settled between the issuer system and the first lender system.

In some non-limiting embodiments, the customer device may include a mobile payment application. Additionally or alternatively, the mobile payment application may include a payment token associated with the first installment payment option. In some non-limiting embodiments, the at least one field of the authorization request may include an account identifier field comprising a payment token. Additionally or alternatively, the payment token may include a bank identification number (BIN) associated with the first lender system associated with the first installment payment option. Additionally or alternatively, the first lender system associated with the first installment payment option may be determined based on the BIN of the payment token. In some non-limiting embodiments, the first authorization request may be received in response to the customer device communicating the payment token to the merchant system.

In some non-limiting embodiments, the payment transaction may be settled between the first lender system and an acquirer system associated with the merchant system. In some non-limiting embodiments, the first lender system may include an issuer system associated with a customer account of the customer. Additionally or alternatively, the issuer system may post periodic payments to the customer account of the customer based on the first installment payment option.

In some non-limiting embodiments, wherein the customer device may include a mobile payment application. Additionally or alternatively, the customer device may receive, via the mobile payment application, a selection of the first installment payment option of the plurality of installment payment options. Additionally or alternatively, an indication of the selection of the first installment payment option of the plurality of installment payment options may be received from the customer device. Additionally or alternatively, account identifier data associated with an account identifier of the customer may be received from the customer device. Additionally or alternatively, the first installment payment option may be approved. Additionally or alternatively, a payment token may be communicated to the mobile payment application of the customer device.

In some non-limiting embodiments, after receiving the first authorization request and before determining the first lender system, the first installment payment data associated with the first installment payment option may be communicated to a plurality of lender systems. Additionally or alternatively, bid data associated with a bid for the first installment payment option may be received from at least one lender system of the plurality of lender systems. In some non-limiting embodiments, the first lender system may be selected from the at least one lender system of the plurality of lender systems based on the bid data.

In some non-limiting embodiments, the first installment payment data may be communicated to at least one merchant lender system of the plurality of lender systems. Additionally or alternatively, if bid data is not received from the at least one merchant lender system, the first installment payment data may be communicated to at least one issuer lender system of the plurality of lender systems. Additionally or alternatively, if bid data is not received from the at least one issuer lender system, the first installment payment data may be communicated to at least one third party lender system of the plurality of lender systems.

In some non-limiting embodiments, in response to communicating the first installment payment data, the at least one lender system approves the first installment payment option for the customer.

According to non-limiting embodiments, provided is a system for providing installment payment options for a payment transaction. In some non-limiting embodiments, the system for providing installment payment options for a payment transaction may include at least one processor and at least one non-transitory computer readable medium comprising instructions to direct the at least one processor to communicate installment payment data associated with a plurality of installment payment options to a customer device. A first authorization request for a payment transaction with a customer of the customer device may be received from a merchant system. The first authorization request may include at least one field comprising first installment payment data associated with a first installment payment option of the plurality of installment payment options. A first lender system associated with the first installment payment option may be determined based on the first installment payment data. A second authorization request including the first installment payment data may be communicated to the first lender system. A first authorization response indicating approval of the first installment payment option for the payment transaction may be received from the first lender system. A second authorization response indicating approval of the payment transaction may be communicated to the merchant system.

In some non-limiting embodiments, before communicating the installment payment data, account identifier data associated with an account identifier of the customer may be received from a mobile payment application on the customer device. Additionally or alternatively, a payment token associated with the account identifier may be generated. Additionally or alternatively, the payment token may be communicated to the mobile payment application of the customer device.

In some non-limiting embodiments, the first authorization request may be received in response to the customer device communicating the payment token to the merchant system.

In some non-limiting embodiments, after communicating the installment payment data, a first message may be received from the customer device. The first message may include an indication of the first installment payment option of the plurality of installment payment options, customer data associated with personal information of the customer, and potential purchase data associated with a potential purchase of the customer. Additionally or alternatively, the first lender system associated with the first installment payment option may be determined based on the indication of the first installment payment option. Additionally or alternatively, a second message may be communicated to the first lender system. The second message may include the indication of the first installment payment option, the customer data, and the potential purchase data. Additionally or alternatively, a third message may be received from the first lender system. The third message may indicate approval of the first installment payment option for the payment transaction. Additionally or alternatively, a fourth message may be communicated to the customer device. The fourth message may indicate approval of the first installment payment option for the payment transaction. Additionally or alternatively, the fourth message may include the first installment payment data associated with the first installment payment option. Additionally or alternatively, the customer device may store the first installment payment data.

In some non-limiting embodiments, the first authorization request may be received in response to the customer device communicating to the merchant system the first installment payment data and at least one of account identifier data associated with an account identifier of the customer or a payment token associated with the account identifier of the customer. Additionally or alternatively, the first authorization request may further include the at least one of the account identifier data or the payment token. In some non-limiting embodiments, the at least one of the account identifier data or the payment token from the first authorization request may be validated. Additionally or alternatively, the first installment payment data may be extracted from the at least one field of the first authorization request. The first installment payment data may be validated based on a comparison of the first installment payment data of the authorization request and the first installment payment data of the fourth message.

In some non-limiting embodiments, the first authorization request may include the payment token. Additionally or alternatively, the payment token may be converted into the account identifier data.

In some non-limiting embodiments, the payment transaction may be settled between the first lender system and an acquirer system associated with the merchant system. Additionally or alternatively, periodic payments may be settled between an issuer system associated with a customer account of the customer and the first lender system.

In some non-limiting embodiments, a transaction amount of the payment transaction may be transferred from the first lender system to an issuer system associated with a customer account of the customer. Additionally or alternatively, a third authorization request for the payment transaction may be communicated to the issuer system. Additionally or alternatively, a third authorization response indicating approval of the payment transaction may be received from the issuer system before communicating the second authorization response. In some non-limiting embodiments, periodic payments may be settled between the issuer system and the first lender system.

In some non-limiting embodiments, the customer device may include a mobile payment application. Additionally or alternatively, the mobile payment application may include a payment token associated with the first installment payment option. In some non-limiting embodiments, the at least one field of the authorization request may include an account identifier field comprising a payment token. Additionally or alternatively, the payment token may include a bank identification number (BIN) associated with the first lender system associated with the first installment payment option. Additionally or alternatively, the first lender system associated with the first installment payment option may be determined based on the BIN of the payment token. In some non-limiting embodiments, the first authorization request may be received in response to the customer device communicating the payment token to the merchant system.

In some non-limiting embodiments, the payment transaction may be settled between the first lender system and an acquirer system associated with the merchant system. In some non-limiting embodiments, the first lender system may include an issuer system associated with a customer account of the customer. Additionally or alternatively, the issuer system may post periodic payments to the customer account of the customer based on the first installment payment option.

In some non-limiting embodiments, wherein the customer device may include a mobile payment application. Additionally or alternatively, the customer device may receive, via the mobile payment application, a selection of the first installment payment option of the plurality of installment payment options. Additionally or alternatively, an indication of the selection of the first installment payment option of the plurality of installment payment options may be received from the customer device. Additionally or alternatively, account identifier data associated with an account identifier of the customer may be received from the customer device. Additionally or alternatively, the first installment payment option may be approved. Additionally or alternatively, a payment token may be communicated to the mobile payment application of the customer device.

In some non-limiting embodiments, after receiving the first authorization request and before determining the first lender system, the first installment payment data associated with the first installment payment option may be communicated to a plurality of lender systems. Additionally or alternatively, bid data associated with a bid for the first installment payment option may be received from at least one lender system of the plurality of lender systems. In some non-limiting embodiments, the first lender system may be selected from the at least one lender system of the plurality of lender systems based on the bid data.

In some non-limiting embodiments, the first installment payment data may be communicated to at least one merchant lender system of the plurality of lender systems. Additionally or alternatively, if bid data is not received from the at least one merchant lender system, the first installment payment data may be communicated to at least one issuer lender system of the plurality of lender systems. Additionally or alternatively, if bid data is not received from the at least one issuer lender system, the first installment payment data may be communicated to at least one third party lender system of the plurality of lender systems.

In some non-limiting embodiments, in response to communicating the first installment payment data, the at least one lender system approves the first installment payment option for the customer.

According to non-limiting embodiments, provided is a computer program product for providing installment payment options for a payment transaction. The computer program product may include at least one non-transitory computer-readable medium including one or more instructions that, when executed by at least one processor, cause the at least one processor to communicate installment payment data associated with a plurality of installment payment options to a customer device. A first authorization request for a payment transaction with a customer of the customer device may be received from a merchant system. The first authorization request may include at least one field comprising first installment payment data associated with a first installment payment option of the plurality of installment payment options. A first lender system associated with the first installment payment option may be determined based on the first installment payment data. A second authorization request including the first installment payment data may be communicated to the first lender system. A first authorization response indicating approval of the first installment payment option for the payment transaction may be received from the first lender system. A second authorization response indicating approval of the payment transaction may be communicated to the merchant system.

In some non-limiting embodiments, before communicating the installment payment data, account identifier data associated with an account identifier of the customer may be received from a mobile payment application on the customer device. Additionally or alternatively, a payment token associated with the account identifier may be generated. Additionally or alternatively, the payment token may be communicated to the mobile payment application of the customer device.

In some non-limiting embodiments, the first authorization request may be received in response to the customer device communicating the payment token to the merchant system.

In some non-limiting embodiments, after communicating the installment payment data, a first message may be received from the customer device. The first message may include an indication of the first installment payment option of the plurality of installment payment options, customer data associated with personal information of the customer, and potential purchase data associated with a potential purchase of the customer. Additionally or alternatively, the first lender system associated with the first installment payment option may be determined based on the indication of the first installment payment option. Additionally or alternatively, a second message may be communicated to the first lender system. The second message may include the indication of the first installment payment option, the customer data, and the potential purchase data. Additionally or alternatively, a third message may be received from the first lender system. The third message may indicate approval of the first installment payment option for the payment transaction. Additionally or alternatively, a fourth message may be communicated to the customer device. The fourth message may indicate approval of the first installment payment option for the payment transaction. Additionally or alternatively, the fourth message may include the first installment payment data associated with the first installment payment option. Additionally or alternatively, the customer device may store the first installment payment data.

In some non-limiting embodiments, the first authorization request may be received in response to the customer device communicating to the merchant system the first installment payment data and at least one of account identifier data associated with an account identifier of the customer or a payment token associated with the account identifier of the customer. Additionally or alternatively, the first authorization request may further include the at least one of the account identifier data or the payment token. In some non-limiting embodiments, the at least one of the account identifier data or the payment token from the first authorization request may be validated. Additionally or alternatively, the first installment payment data may be extracted from the at least one field of the first authorization request. The first installment payment data may be validated based on a comparison of the first installment payment data of the authorization request and the first installment payment data of the fourth message.

In some non-limiting embodiments, the first authorization request may include the payment token. Additionally or alternatively, the payment token may be converted into the account identifier data.

In some non-limiting embodiments, the payment transaction may be settled between the first lender system and an acquirer system associated with the merchant system. Additionally or alternatively, periodic payments may be settled between an issuer system associated with a customer account of the customer and the first lender system.

In some non-limiting embodiments, a transaction amount of the payment transaction may be transferred from the first lender system to an issuer system associated with a customer account of the customer. Additionally or alternatively, a third authorization request for the payment transaction may be communicated to the issuer system. Additionally or alternatively, a third authorization response indicating approval of the payment transaction may be received from the issuer system before communicating the second authorization response. In some non-limiting embodiments, periodic payments may be settled between the issuer system and the first lender system.

In some non-limiting embodiments, the customer device may include a mobile payment application. Additionally or alternatively, the mobile payment application may include a payment token associated with the first installment payment option. In some non-limiting embodiments, the at least one field of the authorization request may include an account identifier field comprising a payment token. Additionally or alternatively, the payment token may include a bank identification number (BIN) associated with the first lender system associated with the first installment payment option. Additionally or alternatively, the first lender system associated with the first installment payment option may be determined based on the BIN of the payment token. In some non-limiting embodiments, the first authorization request may be received in response to the customer device communicating the payment token to the merchant system.

In some non-limiting embodiments, the payment transaction may be settled between the first lender system and an acquirer system associated with the merchant system. In some non-limiting embodiments, the first lender system may include an issuer system associated with a customer account of the customer. Additionally or alternatively, the issuer system may post periodic payments to the customer account of the customer based on the first installment payment option.

In some non-limiting embodiments, wherein the customer device may include a mobile payment application. Additionally or alternatively, the customer device may receive, via the mobile payment application, a selection of the first installment payment option of the plurality of installment payment options. Additionally or alternatively, an indication of the selection of the first installment payment option of the plurality of installment payment options may be received from the customer device. Additionally or alternatively, account identifier data associated with an account identifier of the customer may be received from the customer device. Additionally or alternatively, the first installment payment option may be approved. Additionally or alternatively, a payment token may be communicated to the mobile payment application of the customer device.

In some non-limiting embodiments, after receiving the first authorization request and before determining the first lender system, the first installment payment data associated with the first installment payment option may be communicated to a plurality of lender systems. Additionally or alternatively, bid data associated with a bid for the first installment payment option may be received from at least one lender system of the plurality of lender systems. In some non-limiting embodiments, the first lender system may be selected from the at least one lender system of the plurality of lender systems based on the bid data.

In some non-limiting embodiments, the first installment payment data may be communicated to at least one merchant lender system of the plurality of lender systems. Additionally or alternatively, if bid data is not received from the at least one merchant lender system, the first installment payment data may be communicated to at least one issuer lender system of the plurality of lender systems. Additionally or alternatively, if bid data is not received from the at least one issuer lender system, the first installment payment data may be communicated to at least one third party lender system of the plurality of lender systems.

In some non-limiting embodiments, in response to communicating the first installment payment data, the at least one lender system approves the first installment payment option for the customer.

Further embodiments are set forth in the following numbered clauses:

Clause 1: A method for providing installment payment options for a payment transaction, comprising communicating, with at least one processor to a customer device, installment payment data associated with a plurality of installment payment options; receiving, with at least one processor from a merchant system, a first authorization request for a payment transaction with a customer of the customer device, the first authorization request comprising at least one field comprising first installment payment data associated with a first installment payment option of the plurality of installment payment options; determining, with at least one processor, a first lender system associated with the first installment payment option based on the first installment payment data; communicating, with at least one processor to the first lender system, a second authorization request comprising the first installment payment data; receiving, with at least one processor from the first lender system, a first authorization response indicating approval of the first installment payment option for the payment transaction; and communicating, with at least one processor to the merchant system, a second authorization response indicating approval of the payment transaction.

Clause 2: The method of clause 1, further comprising, before communicating the installment payment data, receiving, with at least one processor from a mobile payment application on the customer device, account identifier data associated with an account identifier of the customer; generating, with at least one processor, a payment token associated with the account identifier; and communicating, with at least one processor, the payment token to the mobile payment application of the customer device.

Clause 3: The method of clauses 1 or 2, wherein receiving the first authorization request is in response to the customer device communicating the payment token to the merchant system.

Clause 4: The method of any preceding clause, further comprising, after communicating the installment payment data, receiving, with at least one processor from the customer device, a first message comprising an indication of the first installment payment option of the plurality of installment payment options, customer data associated with personal information of the customer, and potential purchase data associated with a potential purchase of the customer, determining, with at least one processor, the first lender system associated with the first installment payment option based on the indication of the first installment payment option, communicating, with at least one processor to the first lender system, a second message comprising the indication of the first installment payment option, the customer data, and the potential purchase data, receiving, with at least one processor from the first lender system, a third message indicating approval of the first installment payment option for the payment transaction, communicating, with at least one processor to the customer device, a fourth message indicating approval of the first installment payment option for the payment transaction, the fourth message comprising the first installment payment data associated with the first installment payment option, wherein the customer device stores the first installment payment data.

Clause 5: The method of any preceding clause, wherein receiving the first authorization request is in response to the customer device communicating to the merchant system the first installment payment data and at least one of account identifier data associated with an account identifier of the customer or a payment token associated with the account identifier of the customer.

Clause 6: The method of any preceding clause, wherein the first authorization request further comprises the at least one of the account identifier data or the payment token, the method further comprising validating, with at least one processor, the at least one of the account identifier data or the payment token from the first authorization request; extracting, with at least one processor, the first installment payment data from the at least one field of the first authorization request; and validating, with at least one processor, the first installment payment data based on a comparison of the first installment payment data of the authorization request and the first installment payment data of the fourth message.

Clause 7: The method of any preceding clause, wherein the first authorization request comprises the payment token, the method further comprising converting, with at least one processor, the payment token into the account identifier data.

Clause 8: The method of any preceding clause, further comprising settling, with at least one processor, the payment transaction between the first lender system and an acquirer system associated with the merchant system; and settling, with at least one processor, periodic payments between an issuer system associated with a customer account of the customer and the first lender system.

Clause 9: The method of any preceding clause, transferring, with at least one processor, a transaction amount of the payment transaction from the first lender system to an issuer system associated with a customer account of the customer; communicating, with at least one processor to the issuer system, a third authorization request for the payment transaction; before communicating the second authorization response, receiving, with at least one processor from the issuer system, a third authorization response indicating approval of the payment transaction.

Clause 10: The method of any preceding clause, further comprising settling, with at least one processor, periodic payments between the issuer system and the first lender system.

Clause 11: The method of any preceding clause, wherein the customer device comprises a mobile payment application, and wherein the mobile payment application comprises a payment token associated with the first installment payment option.

Clause 12: The method of any preceding clause, wherein the at least one field comprises an account identifier field comprising a payment token, the payment token comprising a bank identification number (BIN) associated with the first lender system associated with the first installment payment option, and wherein determining the first lender system associated with the first installment payment option comprises determining the first lender system associated with the first installment payment option based on the BIN of the payment token.

Clause 13: The method of any preceding clause, wherein receiving the first authorization request is in response to the customer device communicating the payment token to the merchant system.

Clause 14: The method of any preceding clause, further comprising settling, with at least one processor, the payment transaction between the first lender system and an acquirer system associated with the merchant system.

Clause 15: The method of any preceding clause, wherein the first lender system comprises an issuer system associated with a customer account of the customer; and wherein issuer system posts periodic payments to the customer account of the customer based on the first installment payment option.

Clause 16: The method of any preceding clause, wherein the customer device comprises a mobile payment application, and wherein the customer device receives, via the mobile payment application, a selection of the first installment payment option of the plurality of installment payment options, the method further comprising receiving, with at least one processor from the customer device, an indication of the selection of the first installment payment option of the plurality of installment payment options; receiving, with the at least one processor from the customer device, account identifier data associated with an account identifier of the customer; approving, with the at least one processor, the first installment payment option; and communicating, with the at least one processor to the mobile payment application of the customer device, a payment token.

Clause 17: The method of any preceding clause, further comprising, after receiving the first authorization request and before determining the first lender system, communicating, with the at least one processor, the first installment payment data associated with the first installment payment option to a plurality of lender systems; and receiving, with the at least one processor, bid data associated with a bid for the first installment payment option from at least one lender system of the plurality of lender systems.

Clause 18: The method of any preceding clause, wherein determining the first lender system comprises selecting the first lender system from the at least one lender system of the plurality of lender systems based on the bid data.

Clause 19: The method of any preceding clause, wherein communicating the first installment payment data comprises communicating, with the at least one processor, the first installment payment data to at least one merchant lender system of the plurality of lender systems; if bid data is not received from the at least one merchant lender system, communicating, with the at least one processor, the first installment payment data to at least one issuer lender system of the plurality of lender systems; and if bid data is not received from the at least one issuer lender system, communicating, with the at least one processor, the first installment payment data to at least one third party lender system of the plurality of lender systems.

Clause 20: The method of any preceding clause, wherein, in response to communicating the first installment payment data, the at least one lender system approves the first installment payment option for the customer.

Clause 21: A system for providing installment payment options for a payment transaction, comprising: at least one processor; and at least one non-transitory computer readable medium comprising instructions to direct the at least one processor to: communicate installment payment data associated with a plurality of installment payment options to a customer device; receive, from a merchant system, a first authorization request for a payment transaction with a customer of the customer device, the first authorization request comprising at least one field comprising first installment payment data associated with a first installment payment option of the plurality of installment payment options; determine a first lender system associated with the first installment payment option based on the first installment payment data; communicate a second authorization request comprising the first installment payment data to the first lender system; receive, from the first lender system, a first authorization response indicating approval of the first installment payment option for the payment transaction; and communicate a second authorization response indicating approval of the payment transaction to the merchant system.

Clause 22: The system of clause 21, wherein the instructions further direct the at least one processor to, before communicating the installment payment data: receive, from a mobile payment application on the customer device, account identifier data associated with an account identifier of the customer; generate a payment token associated with the account identifier; and communicate the payment token to the mobile payment application of the customer device.

Clause 23: The system of clauses 21 or 22, wherein receiving the first authorization request is in response to the customer device communicating the payment token to the merchant system.

Clause 24: The system of any one of clauses 21-23, wherein the instructions further direct the at least one processor to, after communicating the installment payment data: receive, from the customer device, a first message comprising an indication of the first installment payment option of the plurality of installment payment options, customer data associated with personal information of the customer, and potential purchase data associated with a potential purchase of the customer; determine the first lender system associated with the first installment payment option based on the indication of the first installment payment option; communicate a second message comprising the indication of the first installment payment option, the customer data, and the potential purchase data to the first lender system; receive, from the first lender system, a third message indicating approval of the first installment payment option for the payment transaction; and communicate a fourth message indicating approval of the first installment payment option for the payment transaction to the customer device, the fourth message comprising the first installment payment data associated with the first installment payment option, wherein the customer device stores the first installment payment data.

Clause 25: The system of any one of clauses 21-24, wherein receiving the first authorization request is in response to the customer device communicating to the merchant system the first installment payment data and at least one of account identifier data associated with an account identifier of the customer or a payment token associated with the account identifier of the customer.

Clause 26: The system of any one of clauses 21-25, wherein the first authorization request further comprises the at least one of the account identifier data or the payment token, and wherein the instructions further direct the at least one processor to: validate the at least one of the account identifier data or the payment token from the first authorization request; extract the first installment payment data from the at least one field of the first authorization request; and validate the first installment payment data based on a comparison of the first installment payment data of the authorization request and the first installment payment data of the fourth message.

Clause 27: The system of any one of clauses 21-26, wherein the first authorization request comprises the payment token, and wherein the instructions further direct the at least one processor to convert the payment token into the account identifier data.

Clause 28: The system of any one of clauses 21-27, wherein the instructions further direct the at least one processor to: settle the payment transaction between the first lender system and an acquirer system associated with the merchant system; and settle periodic payments between an issuer system associated with a customer account of the customer and the first lender system.

Clause 29: The system of any one of clauses 21-28, wherein the instructions further direct the at least one processor to: transfer a transaction amount of the payment transaction from the first lender system to an issuer system associated with a customer account of the customer; communicate a third authorization request for the payment transaction to the issuer system; and before communicating the second authorization response, receive, from the issuer system, a third authorization response indicating approval of the payment transaction.

Clause 30: The system of any one of clauses 21-29, wherein the instructions further direct the at least one processor to: settle periodic payments between the issuer system and the first lender system.

Clause 31: The system of any one of clauses 21-30, wherein the customer device comprises a mobile payment application, and wherein the mobile payment application comprises a payment token associated with the first installment payment option.

Clause 32: The system of any one of clauses 21-31, wherein the at least one field comprises an account identifier field comprising a payment token, the payment token comprising a bank identification number (BIN) associated with the first lender system associated with the first installment payment option; and wherein determining the first lender system associated with the first installment payment option comprises determining the first lender system associated with the first installment payment option based on the BIN of the payment token.

Clause 33: The system of any one of clauses 21-32, wherein receiving the first authorization request is in response to the customer device communicating the payment token to the merchant system.

Clause 34: The system of any one of clauses 21-33, wherein the instructions further direct the at least one processor to: settle the payment transaction between the first lender system and an acquirer system associated with the merchant system.

Clause 35: The system of any one of clauses 21-34, wherein the first lender system comprises an issuer system associated with a customer account of the customer; and wherein issuer system posts periodic payments to the customer account of the customer based on the first installment payment option.

Clause 36: The system of any one of clauses 21-35, wherein the customer device comprises a mobile payment application, and wherein the customer device receives, via the mobile payment application, a selection of the first installment payment option of the plurality of installment payment options, and wherein the instructions further direct the at least one processor to: receive, from the customer device, an indication of the selection of the first installment payment option of the plurality of installment payment options; receive, from the customer device, account identifier data associated with an account identifier of the customer; approve the first installment payment option; and communicate a payment token to the mobile payment application of the customer device.

Clause 37: The system of any one of clauses 21-36, wherein the instructions further direct the at least one processor to, after receiving the first authorization request and before determining the first lender system: communicate the first installment payment data associated with the first installment payment option to a plurality of lender systems; and receive bid data associated with a bid for the first installment payment option from at least one lender system of the plurality of lender systems.

Clause 38: The system of any one of clauses 21-37, wherein determining the first lender system comprises selecting the first lender system from the at least one lender system of the plurality of lender systems based on the bid data.

Clause 39: The system of any one of clauses 21-38, wherein communicating the first installment payment data comprises: communicating the first installment payment data to at least one merchant lender system of the plurality of lender systems; if bid data is not received from the at least one merchant lender system, communicating the first installment payment data to at least one issuer lender system of the plurality of lender systems; and if bid data is not received from the at least one issuer lender system, communicating the first installment payment data to at least one third party lender system of the plurality of lender systems.

Clause 40: The system of any one of clauses 21-39, wherein, in response to communicating the first installment payment data, the at least one lender system approves the first installment payment option for the customer.

Clause 41: A computer program product for providing installment payment options for a payment transaction, the computer program product comprising at least one non-transitory computer-readable medium including one or more instructions that, when executed by at least one processor, cause the at least one processor to: communicate installment payment data associated with a plurality of installment payment options to a customer device; receive, from a merchant system, a first authorization request for a payment transaction with a customer of the customer device, the first authorization request comprising at least one field comprising first installment payment data associated with a first installment payment option of the plurality of installment payment options; determine a first lender system associated with the first installment payment option based on the first installment payment data; communicate a second authorization request comprising the first installment payment data to the first lender system; receive, from the first lender system, a first authorization response indicating approval of the first installment payment option for the payment transaction; and communicate a second authorization response indicating approval of the payment transaction to the merchant system.

Clause 42: The computer program product of clause 41, wherein the instructions further cause the at least one processor to, before communicating the installment payment data: receive, from a mobile payment application on the customer device, account identifier data associated with an account identifier of the customer; generate a payment token associated with the account identifier; and communicate the payment token to the mobile payment application of the customer device.

Clause 43: The computer program product of clauses 41 or 42, wherein receiving the first authorization request is in response to the customer device communicating the payment token to the merchant system.

Clause 44: The computer program product of any one of clauses 41-43, wherein the instructions further cause the at least one processor to, after communicating the installment payment data: receive, from the customer device, a first message comprising an indication of the first installment payment option of the plurality of installment payment options, customer data associated with personal information of the customer, and potential purchase data associated with a potential purchase of the customer; determine the first lender system associated with the first installment payment option based on the indication of the first installment payment option; communicate a second message comprising the indication of the first installment payment option, the customer data, and the potential purchase data to the first lender system; receive, from the first lender system, a third message indicating approval of the first installment payment option for the payment transaction; and communicate a fourth message indicating approval of the first installment payment option for the payment transaction to the customer device, the fourth message comprising the first installment payment data associated with the first installment payment option, wherein the customer device stores the first installment payment data.

Clause 45: The computer program product of any one of clauses 41-44, wherein receiving the first authorization request is in response to the customer device communicating to the merchant system the first installment payment data and at least one of account identifier data associated with an account identifier of the customer or a payment token associated with the account identifier of the customer.

Clause 46: The computer program product of any one of clauses 41-45, wherein the first authorization request further comprises the at least one of the account identifier data or the payment token, and wherein the instructions further cause the at least one processor to: validate the at least one of the account identifier data or the payment token from the first authorization request; extract the first installment payment data from the at least one field of the first authorization request; and validate the first installment payment data based on a comparison of the first installment payment data of the authorization request and the first installment payment data of the fourth message.

Clause 47: The computer program product of any one of clauses 41-46, wherein the first authorization request comprises the payment token, and wherein the instructions further cause the at least one processor to convert the payment token into the account identifier data.

Clause 48: The computer program product of any one of clauses 41-47, wherein the instructions further cause the at least one processor to: settle the payment transaction between the first lender system and an acquirer system associated with the merchant system; and settle periodic payments between an issuer system associated with a customer account of the customer and the first lender system.

Clause 49: The computer program product of any one of clauses 41-48, wherein the instructions further cause the at least one processor to: transfer a transaction amount of the payment transaction from the first lender system to an issuer system associated with a customer account of the customer; communicate a third authorization request for the payment transaction to the issuer system; and before communicating the second authorization response, receive, from the issuer system, a third authorization response indicating approval of the payment transaction.

Clause 50: The computer program product of any one of clauses 41-49, wherein the instructions further cause the at least one processor to: settle periodic payments between the issuer system and the first lender system.

Clause 51: The computer program product of any one of clauses 41-50, wherein the customer device comprises a mobile payment application, and wherein the mobile payment application comprises a payment token associated with the first installment payment option.

Clause 52: The computer program product of any one of clauses 41-51, wherein the at least one field comprises an account identifier field comprising a payment token, the payment token comprising a bank identification number (BIN) associated with the first lender system associated with the first installment payment option; and wherein determining the first lender system associated with the first installment payment option comprises determining the first lender system associated with the first installment payment option based on the BIN of the payment token.

Clause 53: The computer program product of any one of clauses 41-52, wherein receiving the first authorization request is in response to the customer device communicating the payment token to the merchant system.

Clause 54: The computer program product of any one of clauses 41-53, wherein the instructions further cause the at least one processor to: settle the payment transaction between the first lender system and an acquirer system associated with the merchant system.

Clause 55: The computer program product of any one of clauses 41-54, wherein the first lender system comprises an issuer system associated with a customer account of the customer; and wherein issuer system posts periodic payments to the customer account of the customer based on the first installment payment option.

Clause 56: The computer program product of any one of clauses 41-55, wherein the customer device comprises a mobile payment application, and wherein the customer device receives, via the mobile payment application, a selection of the first installment payment option of the plurality of installment payment options, and wherein the instructions further cause the at least one processor to: receive, from the customer device, an indication of the selection of the first installment payment option of the plurality of installment payment options; receive, from the customer device, account identifier data associated with an account identifier of the customer; approve the first installment payment option; and communicate a payment token to the mobile payment application of the customer device.

Clause 57: The computer program product of any one of clauses 41-56, wherein the instructions further cause the at least one processor to, after receiving the first authorization request and before determining the first lender system: communicate the first installment payment data associated with the first installment payment option to a plurality of lender systems; and receive bid data associated with a bid for the first installment payment option from at least one lender system of the plurality of lender systems.

Clause 58: The computer program product of any one of clauses 41-57, wherein determining the first lender system comprises selecting the first lender system from the at least one lender system of the plurality of lender systems based on the bid data.

Clause 59: The computer program product of any one of clauses 41-58, wherein communicating the first installment payment data comprises: communicating the first installment payment data to at least one merchant lender system of the plurality of lender systems; if bid data is not received from the at least one merchant lender system, communicating the first installment payment data to at least one issuer lender system of the plurality of lender systems; and if bid data is not received from the at least one issuer lender system, communicating the first installment payment data to at least one third party lender system of the plurality of lender systems.

Clause 60: The computer program product of any one of clauses 41-59, wherein, in response to communicating the first installment payment data, the at least one lender system approves the first installment payment option for the customer.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, as well as the attached Appendix, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
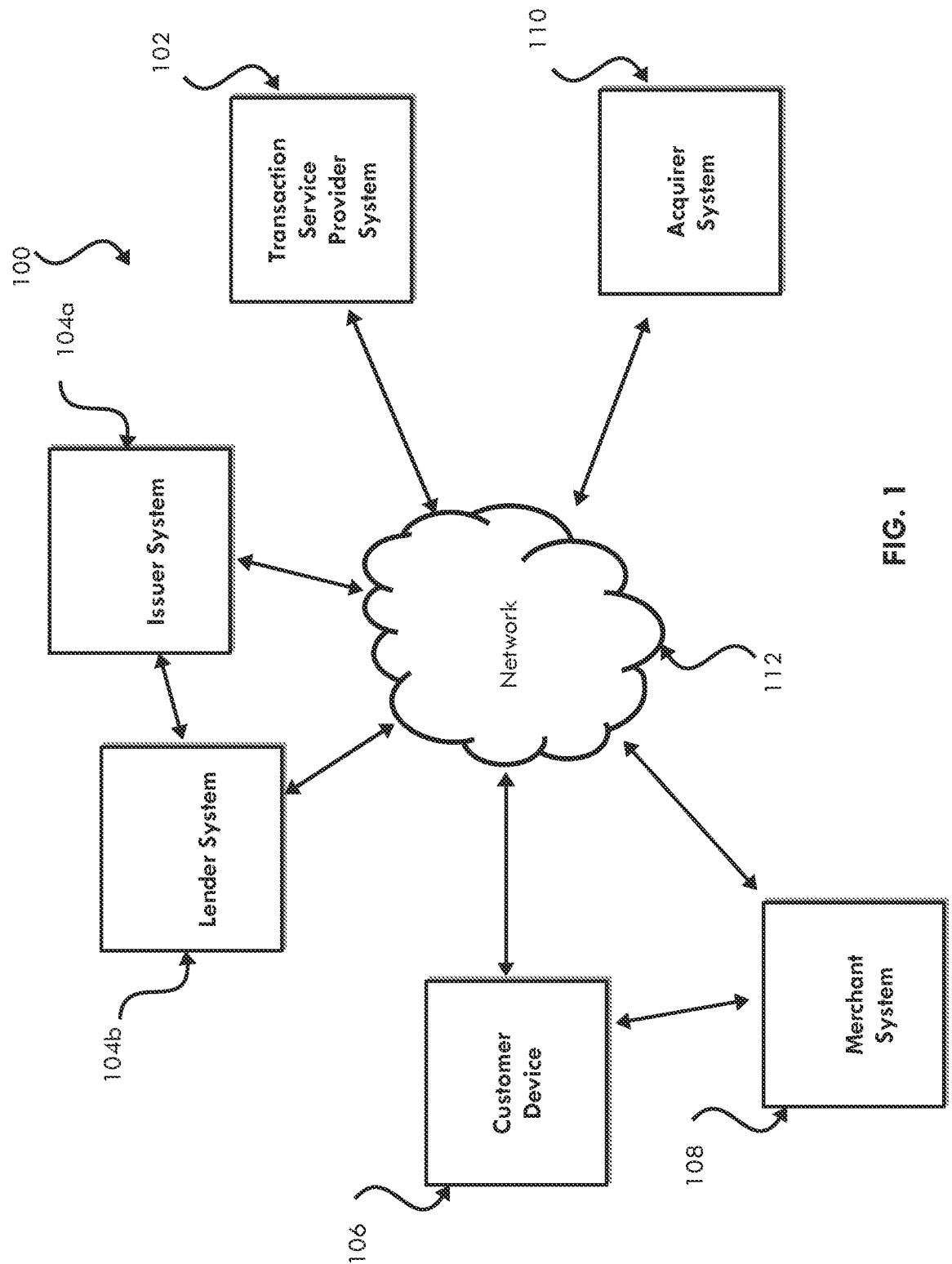
FIG. 1 is a diagram of a non-limiting embodiment of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a token value may be generated such that the recovery of the original PAN or other account identifier from the token value may not be computationally derived (e.g., with a one-way hash or other cryptographic function). Further, in some non-limiting embodiments, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments, a requestor may interface with a network token system through any suitable communication network and/or protocol (e.g., using HTTPS, SOAP and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments, token requestor identifiers may be revoked and/or token requestors may be assigned new token requestor identifiers. In some non-limiting embodiments, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments, the token service provider may have the ability to set aside licensed BINs as token BINs to issue tokens for the PANs that may be submitted to the token service provider. In some non-limiting embodiments, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments, the token vault may be a part of a token service system. For example, the token vault may be provided as a part of the token service provider. Additionally or alternatively, the token vault may be a remote repository accessible by the token service provider. In some non-limiting embodiments, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to systems, methods, and computer program products for providing installment payment options, including, but not limited to, providing installment payment options for a payment transaction using a consumer device. For example, non-limiting embodiments of the disclosed subject matter provide communicating installment payment options to a consumer device and receiving data associated with one of the installment payment options in an authorization request (e.g., in a field thereof). Such embodiments provide techniques and systems for providing the consumer different installment payment options from a plurality of lenders and allowing the user to select one of the installment payment options that the consumer finds preferable. Additionally or alternatively, such embodiments provide techniques and systems for receiving different bids for installment payment options from a plurality of lenders and determining which bid/lender to select based thereon. Additionally or alternatively, such embodiments provide techniques and systems for using installment payment options without modification of the merchant and/or acquirer systems. Additionally or alternatively, such embodiments provide techniques and systems for installment payment options from issuer(s), merchant(s), and/or other lenders. Additionally or alternatively, such embodiments provide techniques and systems for settling the payment transaction and the installment payments between the respective entities.

For the purpose of illustration, in the following description, while the presently disclosed subject matter is described with respect to methods, systems, and computer program products for providing installment payment options, e.g., providing installment payment options for a payment transaction using a consumer device, one skilled in the art will recognize that the disclosed subject matter is not limited to the illustrative embodiments. For example, the methods, systems, and computer program products described herein may be used with a wide variety of settings, such as providing installment payment options in any setting suitable for using such options.

Referring now to FIG. 1, FIG. 1 is a diagram of a non-limiting embodiment of an environment 100 in which systems, products, and/or methods, as described herein, may be implemented. As shown in FIG. 1, environment 100 includes transaction service provider system 102, issuer system 104a, lender system 104b, customer device 106, merchant system 108, acquirer system 110, and network 112.

Transaction service provider system 102 may include one or more devices capable of receiving information from and/or communicating information to issuer system 104a, lender system 104b, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be in communication with a data storage device, which may be local or remote to transaction service provider system 102. In some non-limiting embodiments, transaction service provider system 102 may be capable of receiving information from, storing information in, communicating information to, or searching information stored in the data storage device.

Issuer system 104a may include one or more devices capable of receiving information and/or communicating information to transaction service provider system 102, lender system 104b, customer device 106, merchant system 108, and/or acquirer system 110 via network 112. For example, issuer system 104a may include a computing device, such as a server, a group of servers, and/or other like devices. In some non-limiting embodiments, issuer system 104a may be associated with an issuer institution, as described herein. For example, issuer system 104a may be associated with an issuer institution that issued a credit account, debit account, credit card, debit card, and/or the like to a user associated with customer device 106.

Lender system 104b may include one or more devices capable of receiving information and/or communicating information to transaction service provider system 102, issuer system 104a, customer device 106, merchant system 108, and/or acquirer system 110 via network 112. For example, lender system 104b may include a computing device, such as a server, a group of servers, and/or other like devices. In some non-limiting embodiments, lender system 104b may be the same as, similar to, or a part of issuer system 104a. In some non-limiting embodiments, lender system 104b may be the same as, similar to, or a part of merchant system 108. In some non-limiting embodiments, lender system 104b may be associated with an issuer institution (e.g., a second issuer institution), as described herein, that may be different from the issuer institution associated with issuer system 104a. For example, lender system 104b may be associated with an issuer institution that issued or is willing to issuer a credit account, debit account, credit card, debit card, and/or the like to a user associated with customer device 106. In some non-limiting embodiments, lender system 104b may be associated with a lender institution (e.g., an organization, person, entity, and/or the like) that lends money (e.g., loans) that is not an issuer institution. For example. lender system 104b may be associated with a lender institution that provided or is willing to provide a loan, credit account, installment payment options, and/or the like to a user associated with customer device 106.

Customer device 106 may include one or more devices capable of receiving information from and/or communicating information to transaction service provider system 102, issuer system 104a, lender system 104b, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104a, lender system 104b, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more client devices. For example, merchant system 108 may include a client device that allows a merchant to communicate information to transaction service provider system 102. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104a, lender system 104b, customer device 106, and/or merchant system 108 via network 112. For example, acquirer system 110 may include a computing device, a server, a group of servers, and/or the like. In some non-limiting embodiments, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
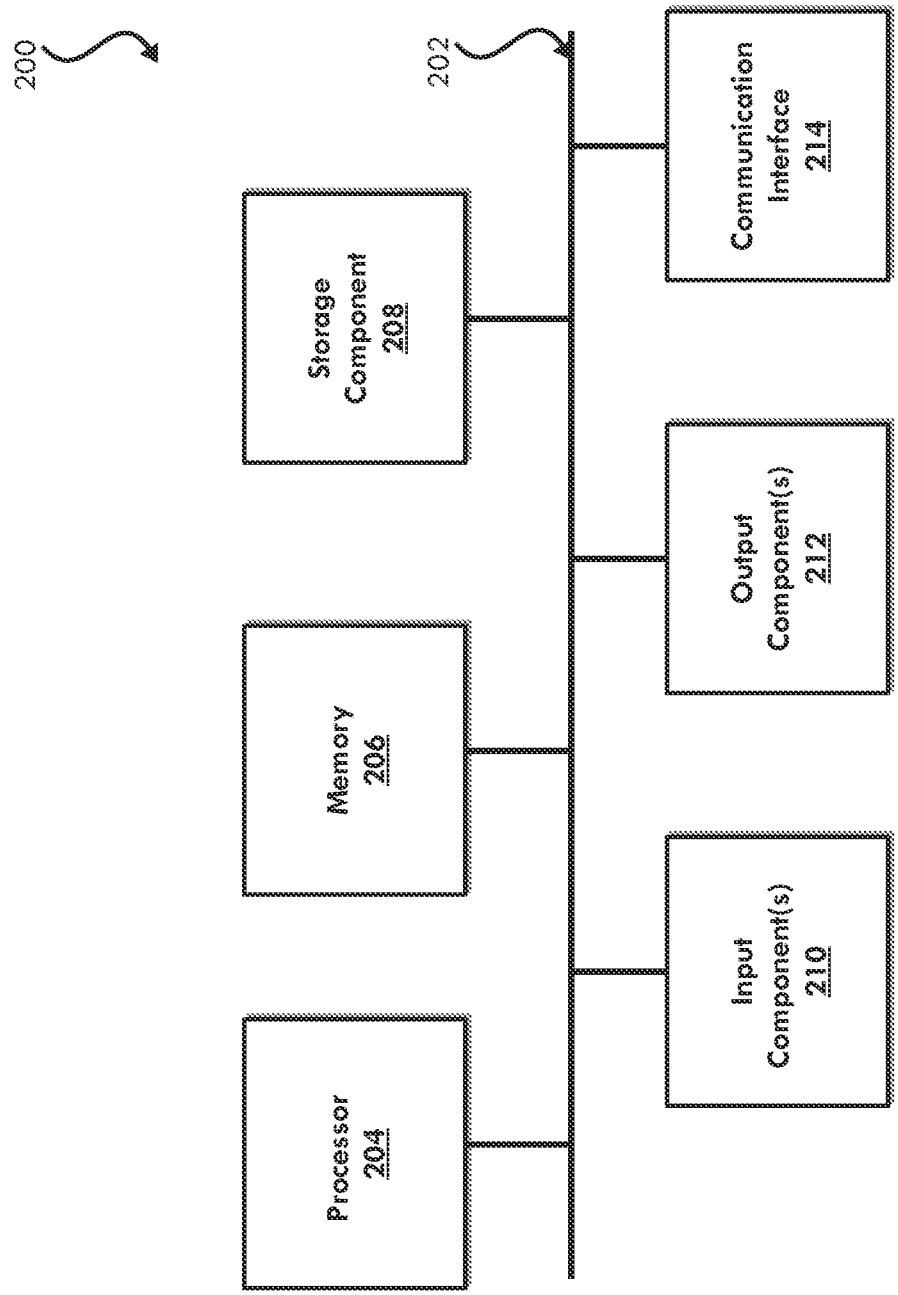
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, one or more devices of issuer system 104a, lender system 104b, customer device 106, one or more devices of merchant system 108, and/or one or more devices of acquirer system 110. In some non-limiting embodiments, transaction service provider system 102, issuer system 104a, lender system 104b, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function.

Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
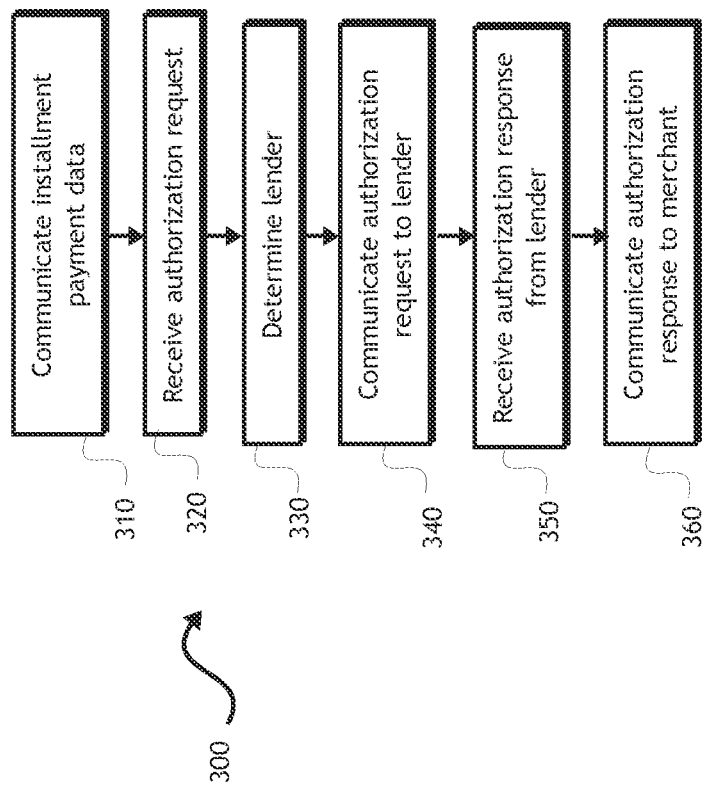
FIG. 3 is a flowchart of a non-limiting embodiment of a process for providing installment payment options for a payment transaction according to the principles of the presently disclosed subject matter.

Referring now to FIG. 3, FIG. 3 is a flowchart of a non-limiting embodiment of a process 300 for providing installment payment options for a payment transaction. In some non-limiting embodiments, one or more of the steps of process 300 may be performed (e.g., completely, partially, and/or the like) by transaction service provider system 102 (e.g., one or more devices of transaction service provider system 102). In some non-limiting embodiments, one or more of the steps of process 300 may be performed (e.g., completely, partially, and/or the like) by another system, another device, another group of systems, or another group of devices, separate from or including transaction service provider system 102, such as issuer system 104*a* (e.g., one or more devices of issuer system 104*a*), lender system 104*b* (e.g., one or more devices of lender system 104*b*), customer device 106, merchant system 108 (e.g., one or more devices of merchant system 108), and/or acquirer system 110 (e.g., one or more devices of acquirer system 110). In some non-limiting embodiments, with reference to FIG. 3, a lender platform may be a system (e.g., one or more devices) that is part of or associated with one or more lender systems 104*b* (e.g., a plurality of lender systems 104*b*), a system (e.g., one or more devices) of a third party that is capable of receiving information from and/or communicating information to one or more lender systems 104*b* (e.g., a plurality of lender systems 104*b*), or a system of (e.g., one or more devices) that is part of or associated with transaction service provider system 102 and is capable of receiving information from and/or communicating information to one or more lender systems 104*b* (e.g., a plurality of lender systems 104*b*). Additionally or alternatively, the lender platform may be capable of receiving information from and/or communicating information to transaction service provider system 102, issuer system 104*a*, customer device 106, merchant system 108, and/or acquirer system 110 via network 112.

As shown in FIG. 3, at step 310, process 300 may include communicating installment payment data. For example, the lender platform and/or transaction service provider system 102 may communicate installment payment data to customer device 106. In some non-limiting embodiments, installment payment data may include a plurality of installment payment options.

In some non-limiting embodiments, before communicating the installment payment data, transaction service provider system 102 may receive account identifier data associated with an account identifier of the customer from customer device 106. For example, the account identifier data may be communicated to transaction service provider system 102 via a mobile payment application on customer device 106. In some non-limiting embodiments, transaction service provider system 102 may generate a payment token associated with the account identifier. Additionally or alternatively, transaction service provider system 102 may communicate the payment token customer device 106 (e.g., to the mobile payment application of customer device 106).

In some non-limiting embodiments, after communicating the installment payment data, transaction service provider system 102 may receive from customer device 106 (e.g., a mobile payment application of customer device 106) a (first) message comprising an indication of the first installment payment option of the plurality of installment payment options. Additionally or alternatively, the (first) message may include customer data associated with personal information of the customer (e.g., account identifier data, token, identifying information such as name and/or address, and/or the like), potential purchase data associated with a potential purchase of the customer (e.g., price information and/or the like), and/or the like. In some non-limiting embodiments, transaction service provider system 102 may determine a first lender system 104*b* associated with the first installment payment option based on the indication of the first installment payment option. Additionally or alternatively, transaction service provider system 102 may communicate to the first lender system 104*b* a (second) message, which may include the indication of the first installment payment option, the customer data, the potential purchase data, and/or the like. In some non-limiting embodiments, the second message may be the same as the first message. In some non-limiting embodiments, the second message may include additional customer data, which transaction service provider system 102 may look up based on the customer data from the first message. For example, such additional customer data may be included in the second message in lieu of or in addition to the customer data. In some non-limiting embodiments, transaction service provider system 102 may receive from the first lender system 104*b* a (third) message indicating approval or pre-approval (or rejection) of the first installment payment option for the payment transaction by the first lender associated with the first lender system 104*b*. In some non-limiting embodiments, transaction service provider system 102 may communicate to customer device 106, (e.g., a mobile payment application of customer device 106), a (fourth) message indicating approval or pre-approval (or rejection) of the first installment payment option for the payment transaction. In some non-limiting embodiments, the (fourth) message may include the first installment payment data associated with the first installment payment option. In some non-limiting embodiments, customer device 106 may store the first installment payment data (e.g., via a mobile payment application). Additionally or alternatively, customer device 106 may store the indication of approval or pre-approval in association with the first installment payment data (e.g., via a mobile payment application).

In some non-limiting embodiments, customer device 106 may include a mobile payment application. Additionally or alternatively, the mobile payment application may include a payment token associated with a first installment payment option.

In some non-limiting embodiments, customer device 106 may include a mobile payment application. Additionally or alternatively, customer device 106 may receive (e.g., via the mobile payment application) a selection of the first installment payment option from among the plurality of installment payment options (e.g., from the customer). In some non-limiting embodiments, the lender platform and/or transaction service provider system 102 may receive an indication of the selection of the first installment payment option from customer device 106 (e.g., via the mobile payment application). Additionally or alternatively, the lender platform and/or transaction service provider 102 may receive customer identifying data (e.g., an account identifier data associated with an account identifier of the customer, name and/or address of the customer, and/or the like) from customer device 106. In some non-limiting embodiments, the lender platform and/or lender system 104*b* may approve or pre-approve the first installment payment option (e.g., based on data communicated directly from customer device 106 and/or relayed via transaction service provider system 102). Additionally or alternatively, the lender platform and/or transaction service provider system 102 may communicate a payment token (e.g., associated with the first installment payment option) to customer device 106 (e.g., the mobile payment application of customer device 106).

In some non-limiting embodiments, the lender platform, lender system 104b, and/or transaction service provider system 102 may communicate first installment payment data to customer device 106. For example, the first installment payment data may include at least one of a creditor identifier, a loan term(s), an approval date, a creditor extension data length, and/or a creditor extension data field.

As shown in FIG. 3, at step 320, process 300 may include receiving an authorization request. For example, transaction service provider system 102 may receive from merchant system 108 (e.g., visa acquirer system 110) an authorization request (e.g., a first authorization request) for a payment transaction with a customer associated with customer device 106 (e.g., a user of customer device 106). In some non-limiting embodiments, the (first) authorization request may include at least one field. For example the at least one of the field(s) may include first installment payment data associated with a first installment payment option of the plurality of installment payment options. In some non-limiting embodiments, the first installment payment option may have been selected by the customer via a mobile payment application on customer device 106.

In some non-limiting embodiments, the first installment payment data may be included in at least one of a discretionary data field of the authorization request, an issuer application data (IAD) field of the authorization request, a reserved or unused field of the authorization request, or the like. Additionally or alternatively, the first installment payment data may include at least one of a creditor identifier, a loan term(s), an approval date, a creditor extension data length, and/or a creditor extension data field, and any or all of such data may be placed in the aforementioned fields of the authorization request.

In some non-limiting embodiments, the at least one field of the (first) authorization request may include an account identifier field comprising a payment token. Additionally or alternatively, the payment token may include a bank identification number (BIN) associated with the first lender system 104b associated with the first installment payment option. In some non-limiting embodiments, transaction service provider system may receive the (first) authorization request in response to customer device 106 communicating the payment token to the merchant system.

In some non-limiting embodiments, customer device 106 may communicate an account identifier (e.g., payment token) to merchant system 108. For example, customer device 106 may use the mobile application to communicate the account identifier (e.g., payment token) to merchant system 108. Additionally or alternatively, customer device 106 may communicate the account identifier (e.g., payment token) to merchant system 108 (e.g., a POS device of merchant system 108) via NFC, contactless payment, payWave, and/or the like. For example, customer device 106 may discover the POS device of merchant system 108 (e.g., via NFC, radio field, and/or the like), may activate and/or select an application for communicating with the POS device, may initiate application processing/communication with the POS device. In some non-limiting embodiments, customer device 106 may communicate the account identifier (e.g., payment token) to merchant system 108 (e.g., a POS device of merchant system 108) via integrated circuit chip, EMV chip, and/or the like.

In some non-limiting embodiments, the first authorization request may be communicated from merchant system 108 to transaction service provider system 102 (e.g., via acquirer system 110) in response to customer device 106 communicating the account identifier (e.g., payment token) to merchant system 108. In some non-limiting embodiments, the first authorization request may be communicated from merchant system 108 to transaction service provider system 102 (e.g., via acquirer system 110) in response to customer device 106 communicating the first installment payment data and account identifier data (e.g., the payment token) to the merchant system 108.

In some non-limiting embodiments, the first authorization request may include the account identifier data (e.g., the payment token). Additionally or alternatively, transaction service provider 102 may validate the account identifier data (e.g., payment token) from the first authorization request. In some non-limiting embodiments, transaction service provider 102 may extract the first installment payment data from the at least one field of the first authorization request. Additionally or alternatively, transaction service provider 102 may validate the first installment payment data based on a comparison of the first installment payment data of the authorization request and the first installment payment data of the fourth message.

In some non-limiting embodiments, the first authorization request may include the payment token. Additionally or alternatively, transaction service provider 102 may convert the payment token into another form of account identifier data (e.g., a PAN of the customer associated with customer device 106).

In some non-limiting embodiments, after receiving the (first) authorization request, transaction service provider system 102 may communicate the first installment payment data associated with the first installment payment option to the lender platform and/or to a plurality of lender systems 104b. Additionally or alternatively, transaction service provider system 102 may receive bid data associated with a bid for the first installment payment option from at least one lender system of the plurality of lender systems 104b (e.g., directly from such lender systems 104b or via the lender platform). In some non-limiting embodiments, each of the at least one lender system 104b that provides bid data approves or pre-approves the first installment payment option for the customer. In some non-limiting embodiments, the first installment payment data may be transmitted to different lenders based on a predetermined priority. For example, transaction service provider system 102 may communicate the first installment payment data to at least one merchant lender system of the plurality of lender systems 104b. Additionally or alternatively, if bid data is not received from the at least one merchant lender system (e.g., the same as or part of merchant system 108), transaction service provider system 102 may communicate the first installment payment data to at least one issuer lender system (e.g., the same as or part of issuer system 104a) of the plurality of lender systems 104b. Additionally or alternatively, if bid data is not received from the at least one issuer lender system, transaction service provider system 102 may communicate the first installment payment data to at least one third party lender system of the plurality of lender systems 104b.

As shown in FIG. 3, at step 330, process 300 may include determining a lender. For example, transaction service provider system 102 may determine a first lender system 104b associated with the first installment payment option based on the first installment payment data from the authorization request. In some non-limiting embodiments, the first installment payment data may include lender identification data associated with an identification of the first lender.

In some non-limiting embodiments, transaction service provider system 102 may determine the first lender system 104b based on the indication of the first installment payment option received from customer device 106, as described herein.

In some non-limiting embodiments, the at least one field of the (first) authorization request may include an account identifier field comprising a payment token. Additionally or alternatively, the payment token may include a BIN associated with the first lender system 104b associated with the first installment payment option. Additionally or alternatively, transaction service provider system 102 may determine the first lender system 104b associated with the first installment payment option based on the BIN of the payment token.

In some non-limiting embodiments, transaction service provider system 102 may determine the first lender system 104b based on selecting the first lender system 104b from the at least one lender system of the plurality of lender systems based on the bid data. For example, transaction service provider system 102 may select a bid associated with the first lender system 104b based on that bid having the most favorable terms (e.g., rate, time period for repayment, and/or the like) for the customer associated with customer device 106.

As shown in FIG. 3, at step 340, process 300 may include communicating an authorization request to the lender. For example, transaction service provider system 102 may communicate to the first lender system 104b an authorization request (e.g., a second authorization request), which may include the first installment payment data. In some non-limiting embodiments, the second authorization request may be the same as the first authorization request.

As shown in FIG. 3, at step 350, process 300 may include receiving an authorization response from the lender. For example, transaction service provider system 102 may receive an authorization response (e.g., a first authorization response) from first lender system 104b. In some non-limiting embodiments, the (first) authorization response may indicate approval (or rejection) of the first installment payment option for the payment transaction.

As shown in FIG. 3, at step 360, process 300 may include communicating an authorization response to the merchant. For example, transaction service provider system 102 may communicate to merchant system 108 (e.g., via acquirer system 110) an authorization response (e.g., second authorization response). In some non-limiting embodiments, the (second) authorization response may indicate approval (or rejection) of the first installment payment option for the payment transaction. Additionally or alternatively, the second authorization response may be the same as the first authorization response.

In some non-limiting embodiments the payment transaction may be settled between the first lender system 104b and acquirer system 110 associated with merchant system 108. For example, transaction service provider system 102 may settle the transaction between the first lender system 104b and acquirer system 110. Additionally or alternatively, transaction service provider 102 may settle the payment transaction with merchant system 108. In some non-limiting embodiments, periodic payments may be settled between issuer system 104a associated with a customer account of the customer and the first lender system 104b. For example, transaction service provider transaction service provider 102 may settle the payment transaction between issuer system 104a and the first lender system 104b. Additionally or alternatively, transaction service provider 102 may settle the periodic payments with customer device 106.

In some non-limiting embodiments, transaction service provider system 102 may transfer a transaction amount of the payment transaction from the first lender system 104b to issuer system 104a associated with a customer account of the customer. Additionally or alternatively, transaction service provider 102 may communicate an authorization request (e.g., third authorization request) for the payment transaction to issuer system 104a. Additionally or alternatively, before communicating the (second) authorization response to the merchant system 108, transaction service provider system 102 may receive from issuer system 104a an authorization response (e.g., third authorization response) indicating approval of the payment transaction. In some non-limiting embodiments, transaction service provider system 102 may settle periodic payments between issuer system 104a and the first lender system 104b.

In some non-limiting embodiments, the first lender system 104b is the same as or a part of issuer system 104a associated with a customer account of the customer. Additionally or alternatively, issuer system 104a may post periodic payments to the customer account of the customer based on the first installment payment option. Additionally or alternatively, transaction service provider system 102 may settle the transaction between issuer system 104a and acquirer system 110 associated with merchant system 108.

Figure 4:
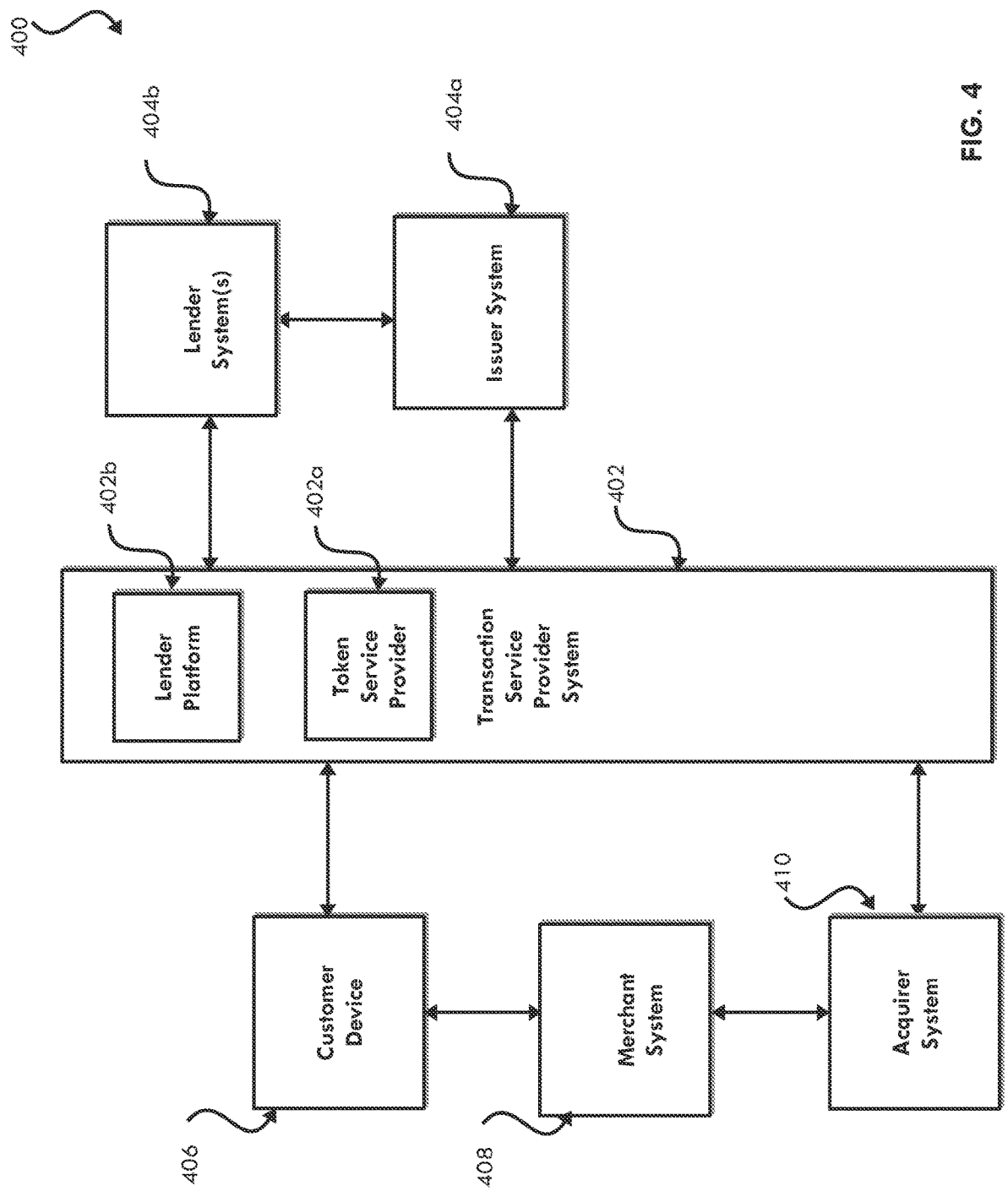
FIG. 4 is a diagram of a non-limiting embodiment of an implementation of a non-limiting embodiment of the process shown in FIG. 3, according to the principles of the presently disclosed subject matter.

Referring to FIG. 4, FIG. 4 is a diagram of an exemplary implementation 400 of a non-limiting embodiment relating to process 300 shown in FIG. 3. As shown in FIG. 4, implementation 400 may include transaction service provider system 402, token service provider 402a, lender platform 402b, issuer system 404a, lender system(s) 404b, customer device 406, merchant system 408, and acquirer system 410. In some non-limiting embodiments, transaction service provider system 402 may be the same as, similar to, or part of transaction service provider system 102 (e.g., one or more devices of transaction service provider system 102). In some non-limiting embodiments, token service provider 402a may be implemented (e.g., completely, partially, and/or the like) by transaction service provider system 402. In some non-limiting embodiments, lender platform 402b may be the same as or similar to the lender platform discussed above regarding FIG. 3. Additionally or alternatively, lender platform 402b may be implemented (e.g., completely, partially, and/or the like) by transaction service provider system 402. In some non-limiting embodiments, issuer system 404a may be the same as, similar to, or part of issuer system 104a (e.g., one or more devices of issuer system 104a). In some non-limiting embodiments, lender system(s) 404b may be the same as, similar to, or part of lender system 104b (e.g., one or more devices of lender system 104b). In some non-limiting embodiments, customer device 406 may be the same as, similar to, or part of customer device 106. In some non-limiting embodiments, merchant system 408 may be the same as, similar to, or part of merchant system 108 (e.g., one or more devices of merchant system 108). In some non-limiting embodiments, acquirer system 410 may be the same as, similar to, or part of acquirer system 110 (e.g., one or more devices of acquirer system 110).

In some non-limiting embodiments, customer device 406 may include a mobile payment application (e.g., provided by a transaction service provider associated with transaction service provider system 402, provided by an issuer associated with issuer system 404a, provided by a third party such as a mobile phone developer and/or app developer, and/or the like). For example, the mobile payment application may include and/or be associated with a digital wallet (e.g., host card emulation (HCE) wallet application, a secure element-based wallet application, a Universal Integrated Circuit Card (UICC)-based wallet application, and/or the like).

In some non-limiting embodiments, customer device 406 may communicate with token service provider 402a (e.g., of transaction service provider system 402 and/or the like) to obtain a payment token, as described herein. For example, customer device 406 may communicate account identifier data associated with an account identifier (e.g., PAN and/or the like) of the customer to token service provider 402a (e.g., of transaction service provider system 402). For example, the account identifier data may be communicated from customer device 406 via the mobile payment application on customer device 406. In some non-limiting embodiments, token service provider 402a (e.g., of transaction service provider system 402) may generate a payment token associated with the account identifier, as described herein. Additionally or alternatively, token service provider 402a (e.g., of transaction service provider system 402) may communicate the payment token customer device 406 (e.g., to the mobile payment application of customer device 406).

In some non-limiting embodiments, customer device 406 may receive (e.g., from transaction service provider system 402, lender platform 402b, lender system(s) 404b, and/or the like), installment payment data associated with a plurality of installment payment options, as described herein. In some non-limiting embodiments, customer device 406 may receive a selection from the customer of a first installment payment option of the plurality of installment payment options. Additionally or alternatively, customer device 406 receive from the customer and/or have access to (e.g., store and/or the like) customer data associated with personal information of the customer (e.g., account identifier data, token, identifying information such as name and/or address, and/or the like), potential purchase data associated with a potential purchase of the customer (e.g., price information and/or the like), and/or the like. In some non-limiting embodiments, customer device 406 may communicate a (first) message to transaction service provider system 402 (e.g., lender platform 402b thereof), as described herein. For example, the (first) message may include an indication of the first installment payment option of the plurality of installment payment options. Additionally or alternatively, the (first) message may include at least some of the customer data, at least some of the potential purchase data, and/or the like.

In some non-limiting embodiments, transaction service provider system 402 (e.g., lender platform 402b thereof) may determine a first lender system 404b associated with the first installment payment option based on the indication of the first installment payment option, as described herein. Additionally or alternatively, transaction service provider system 402 (e.g., lender platform 402b thereof) may communicate to the first lender system 404b a (second) message, which may include the indication of the first installment payment option, at least some of the customer data, at least some of the potential purchase data, and/or the like, as described herein. In some non-limiting embodiments, the second message may include additional customer data, which transaction service provider system 402 may look up based on the customer data from the first message, as described herein. For example, such additional customer data may include credit score, purchase category, mobile geolocation, and/or the like.

In some non-limiting embodiments, the first lender system 404b may determine whether to approve the first installment payment option for the customer based on the second message, as described herein. For example, the first lender system 404b may use the first installment payment option, at least some of the customer data, at least some of the potential purchase data, at least one some the additional customer data, any combination thereof, and/or the like to assess the risk of the first installment payment option for the customer and automatically approve or deny the first installment payment option for the customer based on the assessment of risk (e.g., comparing a risk score to a threshold and/or the like). In some non-limiting embodiments, the first lender system 404b may communicate a (third) message indicating approval or pre-approval (or rejection) of the first installment payment option for the payment transaction by the first lender associated with the first lender system 404b to transaction service provider system 402 (e.g., lender platform 402b thereof).

In some non-limiting embodiments, transaction service provider system 402 may communicate to customer device 406, (e.g., a mobile payment application of customer device 406), a (fourth) message indicating approval or pre-approval (or rejection) of the first installment payment option for the payment transaction, as described herein. Additionally or alternatively, customer device 406 (e.g., a mobile payment application thereof) may connect to transaction service provider system 402 (e.g., lender platform 402b thereof) to retrieve (e.g., request, receive, access, and/or the like) a record associated with the first installment payment option for the customer stored on transaction service provider system 402 (e.g., lender platform 402b thereof). Additionally or alternatively, customer device 406 (e.g., a mobile payment application thereof) may store the data from the (fourth) message and/or the record associated with the first installment payment option for the payment transaction.

In some non-limiting embodiments, customer device 406 may communicate an account identifier (e.g., payment token) to merchant system 408, as described herein. For example, customer device 406 (e.g., a mobile payment application thereof) may communicate with the merchant system 408 via NFC, contactless payment, payWave, barcode, quick response (OR) code, EMV, and/or the like. Additionally or alternatively, customer device 406 (e.g., a mobile payment application thereof) may communicate first installment payment data (e.g., creditor identifier, loan term (s), approval date, creditor extension data length, a creditor extension data field, and/or the like) to merchant system 408, as described herein.

In some non-limiting embodiments, merchant system 408 may communicate a first authorization request to acquirer system 410, as described herein. For example, the first authorization request may include the account identifier (e.g., payment token), first installment payment data, and/or the like, as described herein. In some non-limiting embodiments, acquirer system 410 may communicate the first authorization request to transaction service provider system 402, as described herein.

In some non-limiting embodiments, upon receipt of the first authorization request, transaction service provider system 402 may validate the account identifier (e.g., payment token), as described herein. Additionally or alternatively, transaction service provider system 402 may extract and/or validate the first installment payment data from the first authorization request, as described herein. In some non-limiting embodiments, transaction service provider 402 may detokenize (e.g., decrypt, revers lookup, and/or the like) the payment token to determine the customer's account (e.g., PAN and/or the like).

In some non-limiting embodiments, transaction service provider system 402 (e.g., lender platform 402b thereof) may communicate to the first lender system 404b an authorization request (e.g., a second authorization request), which may include the first installment payment data, as described herein. In some non-limiting embodiments, the second authorization request may also include account identifier data (e.g., PAN and/or the like) of the customer.

In some non-limiting embodiments, the first lender system 404b may communicate an authorization response (e.g., a first authorization response) to transaction service provider system 402 (e.g., lender platform 402b thereof), as described herein. For example, the (first) authorization response may indicate approval (or rejection) of the first installment payment option for the payment transaction. In some non-limiting embodiments, transaction service provider system 402 may communicate an authorization response (e.g., second authorization response) to acquirer system 410, as described herein. Additionally or alternatively, acquirer system 410 may communicate the second authorization response to merchant system 408, as described herein. In some non-limiting embodiments, a merchant associated with merchant system 408 may complete the transaction with the consumer (e.g., provide the goods and/or services associated with the transaction to the consumer) based on the second authorization response. In some non-limiting embodiments, transaction service provider system 402 may settle the transaction between the first lender system 104b and acquirer system 110, as described herein. Additionally or alternatively, the merchant associated with merchant system 408 may receive payment from acquirer system 110. In some non-limiting embodiments, transaction service provider system 402 may settle periodic payments between issuer system 404a associated with a customer account of the customer and the first lender system 404b, as described herein.

In some non-limiting embodiments, a transaction amount of the payment transaction may be transferred from the first lender system 404b to issuer system 404a associated with a customer account of the customer (e.g., via transaction service provider system 402), as described herein. In some non-limiting embodiments, the first lender system 404b may communicate an authorization response (e.g., a first authorization response) to transaction service provider system 402 (e.g., lender platform 402b thereof), as described herein. In some non-limiting embodiments, transaction service provider 402 may communicate an authorization request (e.g., third authorization request) for the payment transaction to issuer system 404a, as described herein. Additionally or alternatively, issuer system 404a may communicate an authorization response (e.g., third authorization response) indicating approval of the payment transaction to transaction service provider system 402, as described herein. Additionally or alternatively, transaction service provider system 402 may communicate an authorization response (e.g., second authorization response) to acquirer system 410, which may communicate the second authorization response to merchant system 408, as described herein. Additionally or alternatively, a merchant associated with merchant system 408 may complete the transaction with the consumer (e.g., provide the goods and/or services associated with the transaction to the consumer) based on the second authorization response, as described herein. In some non-limiting embodiments, transaction service provider system 402 may settle the transaction between issuer system 404a and acquirer system 410, which may provide payment to the merchant associated with merchant system 408, as described herein. In some non-limiting embodiments, transaction service provider system 402 may settle periodic payments between issuer system 404a and the first lender system 404b. Additionally or alternatively, the consumer may set up a separate installment payment account with the first lender associated with the first lender system 404b.

Figure 5:
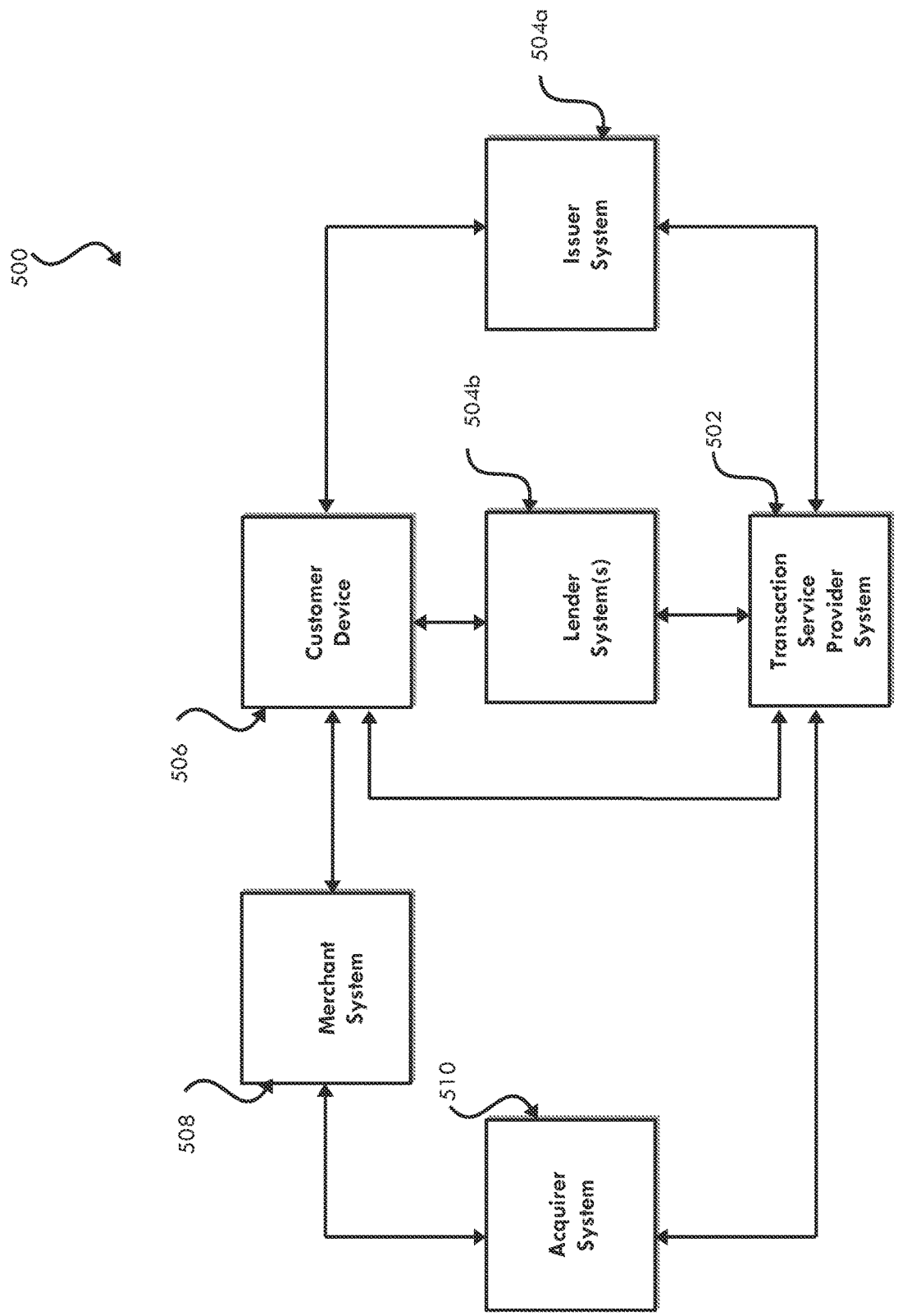
FIG. 5 is a diagram of a non-limiting embodiment of an implementation of a non-limiting embodiment of the process shown in FIG. 3, according to the principles of the presently disclosed subject matter.

Referring to FIG. 5, FIG. 5 is a diagram of an exemplary implementation 500 of a non-limiting embodiment relating to process 300 shown in FIG. 3. As shown in FIG. 5, implementation 500 may include transaction service provider system 502, issuer system 504a, lender system(s) 504b, customer device 506, merchant system 508, and acquirer system 510. In some non-limiting embodiments, transaction service provider system 502 may be the same as, similar to, or part of transaction service provider system 102, transaction service provider system 402, token service provider 402a, lender platform 402b, and/or the like. In some non-limiting embodiments, issuer system 504a may be the same as, similar to, or part of issuer system 104a, issuer system 404a, and/or the like. In some non-limiting embodiments, lender system(s) 504b may be the same as, similar to, or part of lender system 104b, lender system(s) 404b, and/or the like. In some non-limiting embodiments, customer device 506 may be the same as, similar to, or part of customer device 106, customer device 406, and/or the like. In some non-limiting embodiments, merchant system 508 may be the same as, similar to, or part of merchant system 108, merchant system 408, and/or the like. In some non-limiting embodiments, acquirer system 510 may be the same as, similar to, or part of acquirer system 110, acquirer system 410, and/or the like.

In some non-limiting embodiments, lender system 504b may be the same as or part of issuer system 504a associated with a customer account of the customer, as described herein. In some non-limiting embodiments, at least one of issuer system 504a (which may be the same as and/or include lender system 504b) or transaction service provider system 502 (e.g., a lender platform thereof) may communicate installment payment data associated with a plurality of installment payment options to customer device 506 (e.g., a mobile payment application thereof), as described herein. Additionally or alternatively, customer device 506 may receive (e.g., via a mobile payment application) a selection from the customer of the first installment payment option of the plurality of installment payment options, as described herein. In some non-limiting embodiments, the customer device 506 (e.g., a mobile payment application thereof) may include a payment token associated with the first installment payment option, as described herein. Additionally or alternatively, customer device 506 may communicate (e.g., via a mobile payment application thereof) the payment token to merchant system 508 for a transaction, as described herein. In some non-limiting embodiments, merchant system 108 may communicate a first authorization request (e.g., including transaction information, the payment token, first installment payment data, and/or the like) to acquirer system 510, a described herein. Additionally or alternatively, acquirer system 510 may communicate the first authorization request to transaction service provider system 502, as described herein. In some non-limiting embodiments, transaction service provider system 504 may identify issuer system 504a based on the first authorization request, as described herein. Additionally or alternatively, transaction service provider system 502 may communicate a second authorization request (e.g., based on the first authorization request) to issuer system 504a (which may be the same as and/or include lender system 504b), as described herein. In some non-limiting embodiments, issuer system 504a (which may be the same as and/or include lender system 504b) may communicate a first authorization response to transaction service provider system 502, as described herein. Additionally or alternatively, issuer system 504a may place a hold on a consumer account (e.g., credit line and/or the like) based on a transaction amount of the (second) authorization request and/or the like. In some non-limiting embodiments, transaction service provider system 502 may communicate a second authorization response (e.g., based on the first authorization response) to acquirer system 510, as described herein. In some non-limiting embodiments, acquirer system 510 may communicate the second authorization response to merchant system 508, as described herein. Additionally or alternatively, acquirer system 510 may provide payment (e.g., for the full transaction amount, for the transaction amount minus predetermined fees, and/or the like) to a merchant associated with merchant system 508, as described herein. In some non-limiting embodiments, the transaction may be settled between issuer system 504a (which may be the same as and/or include lender system 504b) and acquirer system 510 (e.g., by transaction service provider system 502), as described herein. In some non-limiting embodiments, issuer system 504a (which may be the same as and/or include lender system 504b) may post periodic payments to the customer account of the customer based on the first installment payment option, as described herein. Additionally or alternatively, the hold on the customer's account may be reduced based on the periodic payments, as described herein.

In some non-limiting embodiments, lender system(s) 504b may be separate from issuer system 504a associated with a customer account of the customer, as described herein. In some non-limiting embodiments, at least one of lender system(s) 504b or transaction service provider system 502 (e.g., a lender platform thereof) may communicate installment payment data associated with a plurality of installment payment options to customer device 506 (e.g., a mobile payment application thereof), as described herein. Additionally or alternatively, customer device 506 may receive (e.g., via a mobile payment application) a selection from the customer of the first installment payment option of the plurality of installment payment options, as described herein. In some non-limiting embodiments, the customer device 506 (e.g., a mobile payment application thereof) may include a payment token associated with the first installment payment option, as described herein. Additionally or alternatively, customer device 506 may communicate (e.g., via a mobile payment application thereof) the payment token to merchant system 508 for a transactions, as described herein. In some non-limiting embodiments, merchant system 108 may communicate a first authorization request (e.g., including transaction information, the payment token, first installment payment data, and/or the like) to acquirer system 510, a described herein. Additionally or alternatively, acquirer system 510 may communicate the first authorization request to transaction service provider system 502, as described herein. In some non-limiting embodiments, transaction service provider system 502 may communicate the first installment payment data associated with the first installment payment option to a plurality of lender systems 504b. Additionally or alternatively, at least some of the first plurality of lender systems 504b may communicate bid data to transaction service provider system 502, as described herein. In some non-limiting embodiments, each lender system 504b may approve/pre-approve the first installment payment option and/or place a hold on a credit line for the consumer, as described herein. In some non-limiting embodiments, each lender system 504b may communicate an authorization response (e.g., first authorization response) for the first installment payment option to transaction service provider system 502, as described herein. In some non-limiting embodiments, transaction service provider system 502 may select a first lender system 504b from the plurality of lender systems 504b based on the bid data, as described herein. In some non-limiting embodiments, transaction service provider system 502 may communicate a second authorization request (e.g., based on the first authorization request, the bid data, and/or the selection of the first lender system 504b) to issuer system 504a, as described herein. In some non-limiting embodiments, transaction service provider system 502 may communicate an authorization response (e.g., second authorization response, which may be based on the first authorization response, the bid data, the selection of the first lender system 504b, and/or the like) to acquirer system 510, as described herein. In some non-limiting embodiments, a first periodic payment may be settled between issuer system 504a (which may be the same as and/or include lender system 504b) and acquirer system 510 (e.g., by transaction service provider system 502), as described herein. In some non-limiting embodiments, acquirer system 510 may communicate the second authorization response to merchant system 508, as described herein. Additionally or alternatively, acquirer system 510 may provide payment (e.g., for the full transaction amount, for the transaction amount minus predetermined fees, and/or the like) to a merchant associated with merchant system 508, as described herein. In some non-limiting embodiments, issuer system 504a may post periodic payments to the customer account of the customer based on the first installment payment option, as described herein. Additionally or alternatively, issuer system 504a may receive the payment amounts for the periodic payment from the customer, as described herein. In some non-limiting embodiments, issuer system 504a may communicate repayment data associated with receiving the periodic payment amounts from the customer (e.g., to transaction service provider system 502, acquirer system 510, and/or the like). Additionally or alternatively, transaction service provider system 502 may communicate (e.g., route) the repayment data to acquirer system 510. In some non-limiting embodiments, each periodic payment may be settled between acquirer system 510 and issuer system 504a (e.g., by transaction service provider system 502), as described herein. For example, a transaction identifier associated with the first installment payment option (e.g., the transaction identifier may be included in the first installment payment data, at least one of the authorization requests, and/or the like) may be used for repayment and/or settlement of the periodic payments.

Figure 6:
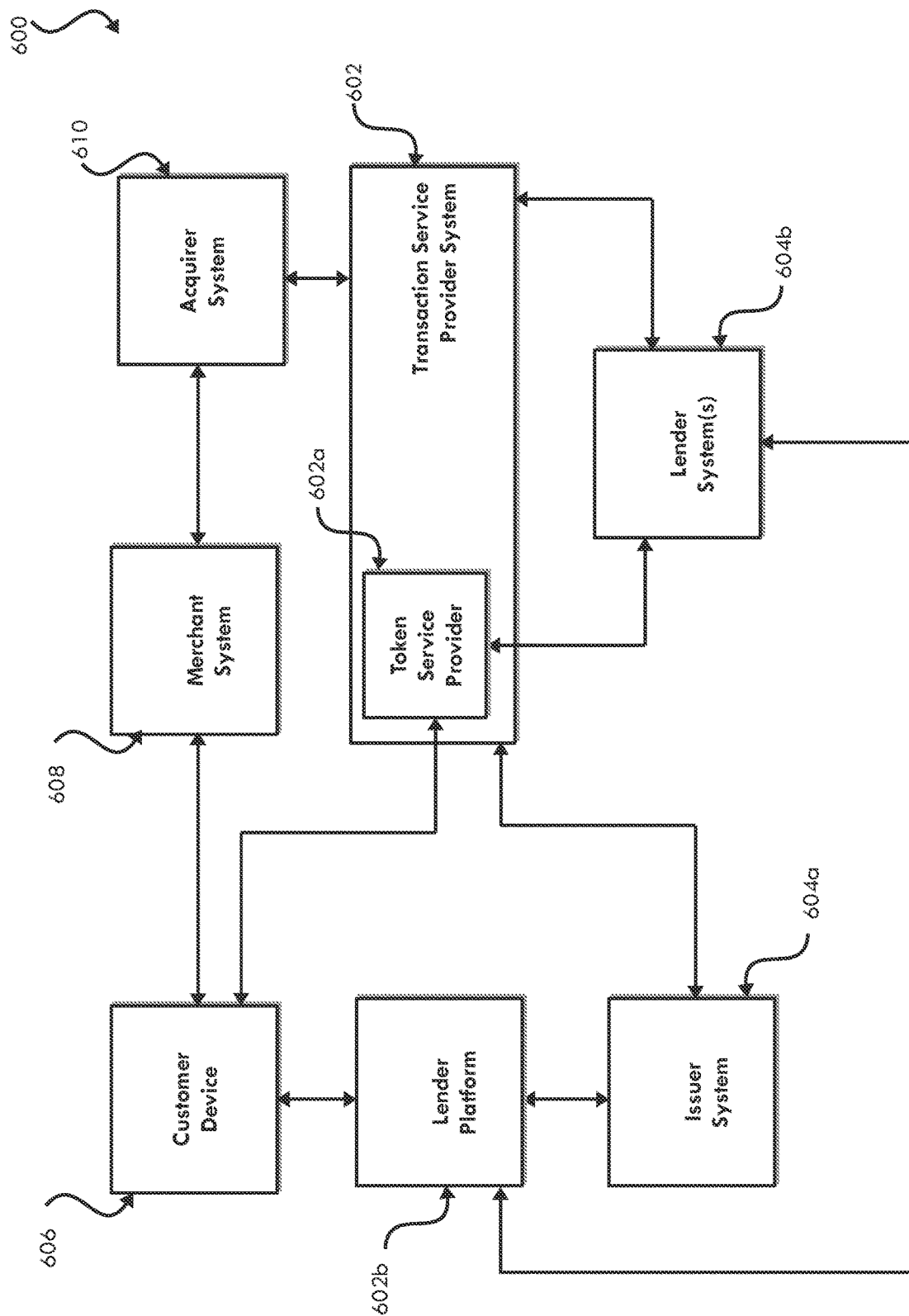
FIG. 6 is a diagram of a non-limiting embodiment of an implementation of a non-limiting embodiment of the process shown in FIG. 3, according to the principles of the presently disclosed subject matter.

Referring to FIG. 6, FIG. 6 is a diagram of an exemplary implementation 600 of a non-limiting embodiment relating to process 300 shown in FIG. 3. As shown in FIG. 6, implementation 600 may include transaction service provider system 602, token service provider 602a, lender platform 602b, issuer system 604a, lender system(s) 604b, customer device 606, merchant system 608, and acquirer system 610. In some non-limiting embodiments, transaction service provider system 602 may be the same as, similar to, or part of transaction service provider system 102, transaction service provider system 402, transaction service provider system 502, and/or the like. In some non-limiting embodiments, token service provider 602a may be the same as or similar to token service provider 402a. Additionally or alternatively, token service provider 602a may be implemented (e.g., completely, partially, and/or the like) by transaction service provider system 602. In some non-limiting embodiments, lender platform 602b may be the same as or similar to lender platform 402b. Additionally or alternatively, lender platform 602b may be the same as or similar to the lender platform discussed above regarding FIG. 3. Additionally or alternatively, lender platform 602b may be implemented (e.g., completely, partially, and/or the like) by transaction service provider system 602. Additionally or alternatively, lender platform 602b may be a system (e.g., one or more devices) that is part of or associated with one or more lender system(s) 604b (e.g., a plurality of lender systems 604b), a system (e.g., one or more devices) of a third party that is capable of receiving information from and/or communicating information to one or more lender system(s) 604b, and/or the like. Additionally or alternatively, lender platform 602b may be capable of receiving information from and/or communicating information to transaction service provider system 602, issuer system 604a, lender system(s) 604b, customer device 606, merchant system 608, and/or acquirer system 610. In some non-limiting embodiments, issuer system 604a may be the same as, similar to, or part of issuer system 104a, issuer system 404a, issuer system 504a, and/or the like. In some non-limiting embodiments, lender system(s) 604b may be the same as, similar to, or part of lender system 104b, lender system(s) 404b, lender system(s) 504b, and/or the like. In some non-limiting embodiments, customer device 606 may be the same as, similar to, or part of customer device 106, customer device 406, customer device 506, and/or the like. In some non-limiting embodiments, merchant system 608 may be the same as, similar to, or part of merchant system 108, merchant system 408, merchant system 508, and/or the like. In some non-limiting embodiments, acquirer system 610 may be the same as, similar to, or part of acquirer system 110, acquirer system 410, acquirer system 510, and/or the like.

In some non-limiting embodiments, at least one of lender platform 602b, lender system(s) 604b, or transaction service provider system 602 may communicate installment payment data associated with a plurality of installment payment options to customer device 606 (e.g., a mobile payment application thereof), as described herein. For example, lender platform 602b may communicate installment payment options to customer device 606 (e.g., a mobile payment application thereof), as described herein. In some non-limiting embodiments, customer device 606 may receive (e.g., via a mobile payment application) a selection from the customer of the first installment payment option of the plurality of installment payment options associated with a first lender system 604b, as described herein. Additionally or alternatively, customer device 606 may receive a selection from the customer of at least one account identifier (e.g., a preferred account identifier for repayment of the periodic payments). In some non-limiting embodiments, customer device 606 may communicate (e.g., via a mobile payment application thereof) the selection of the first installment payment option (e.g., to lender platform 602b, the first lender system 604b, and/or the like). Additionally or alternatively, lender platform 602b may communicate the selection of the first installment payment option to the first lender system 604b and/or the like. Additionally or alternatively, the first lender system 604b may communicate approval (e.g., authorization, pre-authorization, and/or the like) of the first installment payment option (e.g., to lender platform 602b, customer device 606, and/or the like). Additionally or alternatively, lender platform 602b may communicate approval of the first installment payment option to customer device 606. In some non-limiting embodiments, the first lender system 604b may issue a funding account (e.g., credit line and/or the like) with a total amount of credit available for the first installment payment option. In some non-limiting embodiments, at least one of the first lender system 604b and/or token service provider 602a (e.g., of transaction service provider 602 and/or the like) may generate a payment token for the first installment payment option, as described herein. Additionally or alternatively, the payment token may be communicated to customer device 606 (e.g., a mobile payment application thereof), as described herein. For example, the payment token may be based on a payment token BIN series of a time period associated with the selected first installment payment option. Additionally or alternatively, the payment token may be viewable by the consumer on customer device 606 (e.g., displayed thereon using the mobile payment application thereof). For example, different BIN series may allow lender system 604b to offer different installment payment options (e.g., as many as desired). In some non-limiting embodiments, customer device 506 may communicate (e.g., via a mobile payment application thereof) the payment token to merchant system 508 for a transactions, as described herein. In some non-limiting embodiments, merchant system 108 may communicate a first authorization request (e.g., including transaction information, the payment token, first installment payment data, and/or the like) to acquirer system 510, a described herein. Additionally or alternatively, acquirer system 510 may communicate the first authorization request to transaction service provider system 502, as described herein. In some non-limiting embodiments, transaction service provider system 502 may identify the first lender system 604b (e.g., based on the payment token, the BIN thereof, and/or the like), as described herein. Additionally or alternatively, transaction service provider system 502 may communicate (e.g., to first lender system 604b) a second authorization message, e.g., including at least a portion of the data from the first authorization message and an indicator associated with installment payments (e.g., an indicator associated with the first installment payment option and/or the like). In some non-limiting embodiments, the first lender system 604b may identify the issued funding account based on at least one of the payment token (e.g., including the BIN thereof and/or the like), the indicator, and/or the like. Additionally or alternatively, the first lender system 604b may validate the second authorization request and/or the first installment payment data. For example, the first lender system 604b may determine whether the first installment payment data matches the funding account, determine whether the funding account is sufficiently funded for the first installment payment option, and/or the like. In some non-limiting embodiments, the first lender system 604b may communicate an authorization response (e.g., first authorization response) for the first installment payment option to transaction service provider system 602, as described herein. In some non-limiting embodiments, transaction service provider system 602 may communicate a second authorization response (e.g., based on the first authorization response) to acquirer system 610, as described herein. In some non-limiting embodiments, acquirer system 610 may communicate the second authorization response to merchant system 608, as described herein. Additionally or alternatively, a merchant associated with merchant system 608 may complete the transaction with the consumer (e.g., provide the goods and/or services associated with the transaction to the consumer) based on the second authorization response, as described herein. In some non-limiting embodiments, the first lender system 604b may deduct (e.g., debit and/or the like) periodic payments from the funding account and/or from the consumer account associated with the selected account identifier. Additionally or alternatively, the first lender system 604*b* may post the periodic payments (e.g., without interest). In some non-limiting embodiments, transaction service provider system 602 may settle the transaction amount (e.g., the full transaction amount, the transaction amount minus predetermined fees, and/or the like) between acquirer system 610 and the first lender system 604*b*. Additionally or alternatively, transaction service provider system 602 may store the transaction in a settlement service. In some non-limiting embodiments, the first lender system 604*b* may communicate at least one notification to the consumer (e.g., customer device 606 and/or the like) at a predetermined period before each periodic payment (e.g., a selected number of days and/or the like).

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for providing installment payment options for a payment transaction, comprising:

communicating, with at least one lender platform server to a mobile payment application of a customer device, installment payment data associated with a plurality of installment payment options, wherein the mobile payment application comprises a digital wallet comprising at least one of: a host card emulation (HCE) wallet application, a secure element-based wallet application, or a Universal Integrated Circuit Card (UICC)-based wallet application;

receiving, with the at least one lender platform server from the mobile payment application of the customer device in response to the mobile payment application of the customer device receiving a selection of a first installment payment option of the plurality of installment payment options, a first message comprising an indication of the first installment payment option of the plurality of installment payment options, customer data associated with personal information of a customer of the customer device, and potential purchase data associated with a potential purchase of the customer;

determining, with the at least one lender platform server, a lender system associated with the first installment payment option based on the indication of the first installment payment option;

communicating, with the at least one lender platform server to the lender system, a second message comprising the indication of the first installment payment option, the customer data, and the potential purchase data;

receiving, with the at least one lender platform server from the lender system, a third message indicating approval of the first installment payment option for a payment transaction;

communicating, with the at least one lender platform to the customer device, a fourth message indicating approval of the first installment payment option for the payment transaction;

generating, with a token vault, a payment token associated with the first installment payment option, wherein generating the payment token comprises generating a cryptographic hash based on an account identifier of the customer of the customer device, wherein the payment token comprises a bank identification number (BIN) associated with the lender system associated with the first installment payment option, wherein the token vault comprises a remote storage device accessible by a token service provider system, and wherein the token vault stores a mapping between the account identifier and the payment token using logical security;

communicating, with the token service provider system, the payment token to the mobile payment application of the customer device;

receiving, with a transaction service provider system from a merchant system in response to the customer device communicating to a point-of-sale (POS) device of the merchant system via near-field communication (NFC) the payment token, a first authorization request for the payment transaction with the customer, wherein the customer device discovers the POS device of the merchant system via NFC and selects the mobile payment application for activation in communicating the payment token to the POS device, wherein the first authorization request comprises at least one field comprising first installment payment data associated with the first installment payment option of the plurality of installment payment options, wherein the first installment payment data comprises the payment token;

extracting, with the transaction service provider system, the first installment payment data from the at least one field of the first authorization request;

determining, with the transaction service provider system, the lender system associated with the first installment payment option based on the BIN of the payment token;

communicating, with the at least one lender platform server to the lender system, a second authorization request for the first installment payment option for the payment transaction;

receiving, with the transaction service provider system via the at least one lender platform server from the lender system, a first authorization response indicating approval of the first installment payment option for the payment transaction; and in response to receiving the first authorization response at the transaction service provider system, communicating, with the transaction service provider system to the merchant system, a second authorization response indicating approval of the payment transaction.

2. The method of claim 1, further comprising:

converting, with the token vault, the payment token into account identifier data associated with the account identifier of the customer.

3. The method of claim 1, wherein the lender system comprises an issuer system.

4. The method of claim 3, wherein the issuer system posts periodic payments to a customer account of the customer based on the first installment payment option.

5. The method of claim 1, further comprising:
settling, with the transaction service provider system, the payment transaction between the lender system and an acquirer system associated with the merchant system; and
settling, with the transaction service provider system, periodic payments between an issuer system and the lender system.

6. The method of claim 1, further comprising:
settling, with the transaction service provider system, periodic payments between an issuer system and the lender system.

7. The method of claim 1, further comprising:
settling, with the transaction service provider system, the payment transaction between the lender system and an acquirer system associated with the merchant system.

8. The method of claim 7, wherein the lender system comprises the issuer system; and
wherein the issuer system posts periodic payments to the customer account of the customer based on the first installment payment option.

9. A system for providing installment payment options for a payment transaction, comprising:
at least one lender platform server configured to:
communicate, to a mobile payment application of a customer device, installment payment data associated with a plurality of installment payment options, wherein the mobile payment application comprises a digital wallet comprising at least one of: a host card emulation (HCE) wallet application, a secure element-based wallet application, or a Universal Integrated Circuit Card (UICC)-based wallet application;
receive, from the mobile payment application of the customer device in response to the mobile payment application of the customer device receiving a selection of a first installment payment option of the plurality of installment payment options, a first message comprising an indication of the first installment payment option of the plurality of installment payment options, customer data associated with personal information of a customer of the customer device, and potential purchase data associated with a potential purchase of the customer;
determine a lender system associated with the first installment payment option based on the indication of the first installment payment option;
communicate, to the lender system, a second message comprising the indication of the first installment payment option, the customer data, and the potential purchase data;
receive, from the lender system, a third message indicating approval of the first installment payment option for a payment transaction; and
communicate, to the customer device, a fourth message indicating approval of the first installment payment option for the payment transaction;
a token vault configured to:
generate a payment token associated with the first installment payment option, wherein generating the payment token comprises generating a cryptographic hash based on an account identifier of the customer of the customer device, wherein the payment token comprises a bank identification number (BIN) associated with the lender system associated with the first installment payment option, wherein the token vault comprises a remote storage device accessible by a token service provider system, and wherein the token vault stores a mapping between the account identifier and the payment token using logical security,
wherein the token service provider system is further configured to communicate the payment token to the point of sale mobile payment application of the customer device; and
a transaction service provider system configured to:
receive, from a merchant system in response to the customer device communicating to a point-of-sale (POS) device of the merchant system via near-field communication (NFC) the payment token, a first authorization request for the payment transaction with the customer, wherein the customer device discovers the POS device of the merchant system via NFC and selects the mobile payment application for activation in communicating the payment token to the POS device, wherein the first authorization request comprises at least one field comprising first installment payment data associated with the first installment payment option of the plurality of installment payment options, wherein the first installment payment data comprises the payment token;
extract the first installment payment data from the at least one field of the first authorization request;
determine the lender system associated with the first installment payment option based on the BIN of the payment token;
communicate, via the at least one lender platform server to the lender system, a second authorization request for the first installment payment option for the payment transaction;
receive, via the at least one lender platform server from the lender system, a first authorization response indicating approval of the first installment payment option for the payment transaction; and
in response to receiving the first authorization response at the transaction service provider system, communicate, to the merchant system, a second authorization response indicating approval of the payment transaction.

10. The system of claim 9, wherein the token vault is further configured to convert the payment token into account identifier data associated with the account identifier of the customer.

11. The system of claim 9, wherein the lender system comprises an issuer system.

12. The system of claim 11, wherein the issuer system posts periodic payments to a customer account of the customer based on the first installment payment option.

13. The system of claim 9, wherein the transaction service provider system is further configured to:
settle the payment transaction between the lender system and an acquirer system associated with the merchant system; and
settle periodic payments between an issuer system and the lender system.

* * * * *

UNITED STATES PATENT AND TRADEMARK OFFICE
CERTIFICATE OF CORRECTION

| | | |
|---|---|---|
| PATENT NO. | : 12,423,670 B2 | Page 1 of 1 |
| APPLICATION NO. | : 17/576332 | |
| DATED | : September 23, 2025 | |
| INVENTOR(S) | : Yuexi Chen | |

It is certified that error appears in the above-identified patent and that said Letters Patent is hereby corrected as shown below:

In the Claims

Column 46, Line 8, Claim 9, after "system is" delete "further"

Column 46, Line 10, Claim 9, before "mobile" delete "point of sale"

Signed and Sealed this
Eleventh Day of November, 2025

John A. Squires
*Director of the United States Patent and Trademark Office*